(12) United States Patent
Niemela et al.

(10) Patent No.: US 12,432,655 B2
(45) Date of Patent: Sep. 30, 2025

(54) VIRTUAL POWER PLANT INTEROPERABILITY

(71) Applicant: Nokia Solutions and Networks Oy, Espoo (FI)

(72) Inventors: Tuomas Niemela, Helsinki (FI); Seppo Olavi Hamalainen, Helsinki (FI); Olli Pekka Salmela, Helsinki (FI); Topi Tuomas Volkov, Kantvik (FI); Henri Jonni Koskela, Espoo (FI); Petri Olavi Jappila, Helsinki (FI); Scaria Kurian, Bangalore (IN)

(73) Assignee: Nokia Solutions and Networks Oy, Espoo (FI)

( * ) Notice: Subject to any disclaimer, the term of this patent is extended or adjusted under 35 U.S.C. 154(b) by 0 days.

(21) Appl. No.: 18/652,964

(22) Filed: May 2, 2024

(65) Prior Publication Data

US 2024/0373345 A1    Nov. 7, 2024

(30) Foreign Application Priority Data

May 5, 2023    (FI) .................................... 20235502

(51) Int. Cl.
*H04W 52/02*    (2009.01)
*H04L 41/0895*    (2022.01)
*H04L 41/5009*    (2022.01)

(52) U.S. Cl.
CPC ..... *H04W 52/0206* (2013.01); *H04L 41/0895* (2022.05); *H04L 41/5009* (2013.01)

(58) Field of Classification Search
CPC .......... H04W 52/0261; H04W 52/0277; H04L 41/149
See application file for complete search history.

(56) References Cited

U.S. PATENT DOCUMENTS

2013/0176000 A1* 7/2013 Bishop ................ H02J 7/00
                                                      320/149
2014/0011543 A1   1/2014 Li et al. ................ 455/561
(Continued)

FOREIGN PATENT DOCUMENTS

CN    106102095 B  *  5/2020   ........ H04W 28/0221
CN    112803495 A     5/2021
(Continued)

OTHER PUBLICATIONS

"Distributed Energy Storage," https://web.archive.org/web/20230402005545/https://elisa.com/des/, Sep. 21, 2023.

*Primary Examiner* — Romani Ohri
(74) *Attorney, Agent, or Firm* — McCarter & English LLP

(57) ABSTRACT

Disclosed is a method including receiving, from an application or function, information indicating at least one of: one or more actions performed or predicted to be performed by the application or function, or one or more key performance indicators indicating an impact or predicted impact of the one or more actions, the one or more actions causing a change in at least one of: communication traffic associated with the one or more base stations, or power consumption of the one or more base stations or one or more subcomponents of the one or more base stations; determine, based at least partly on the received information, one or more virtual power plant actions or one or more peak shaving actions associated with at least one base station; and initiate the one or more virtual power plant actions or the one or more peak shaving actions.

18 Claims, 14 Drawing Sheets

(56) References Cited

U.S. PATENT DOCUMENTS

| | | | | |
|---|---|---|---|---|
| 2014/0119254 A1* | 5/2014 | Ansari | ............. | H04W 52/0206 |
| | | | | 370/311 |
| 2014/0171140 A1* | 6/2014 | Iwabuchi | ............. | H04W 24/10 |
| | | | | 455/522 |
| 2017/0090447 A1* | 3/2017 | Skocypec | ............ | B65B 67/1238 |
| 2019/0092176 A1* | 3/2019 | Uyeki | ................... | B60L 53/665 |
| 2019/0341807 A1* | 11/2019 | Nakamura | ............. | H02J 13/00 |
| 2023/0080777 A1* | 3/2023 | Frenger | ................ | H02J 7/0013 |
| | | | | 307/66 |

FOREIGN PATENT DOCUMENTS

| | | | | |
|---|---|---|---|---|
| CN | 112968456 A | 6/2021 | | |
| CN | 114977163 A | 8/2022 | | |
| EP | 4236431 A1 | 8/2023 | | |
| FI | 20215944 A1 | 3/2023 | | |
| WO | WO-2014065818 A1 * | 5/2014 | ........ | H04W 52/0203 |

\* cited by examiner

VIRTUAL POWER PLANT INTEROPERABILITY

FIELD

The following example embodiments relate to wireless communication and to energy storage.

BACKGROUND

The availability of some energy sources, such as solar and wind power, may be intermittent. In addition, energy demand may fluctuate during different times of day, for example. It is desirable to provide solutions in order to ensure a constant supply of energy from a power grid despite of fluctuations in power production and/or energy demand.

BRIEF DESCRIPTION

The scope of protection sought for various example embodiments is set out by the independent claims. The example embodiments and features, if any, described in this specification that do not fall under the scope of the independent claims are to be interpreted as examples useful for understanding various embodiments.

According to an aspect, there is provided an apparatus comprising at least one processor, and at least one memory storing instructions that, when executed by the at least one processor, cause the apparatus at least to: receive, from an application or function, information indicating at least one of: one or more actions performed or predicted to be performed by the application or function, or one or more key performance indicators indicating an impact or predicted impact of the one or more actions, the one or more actions causing a change in at least one of: communication traffic associated with the one or more base stations, or power consumption of the one or more base stations or one or more subcomponents of the one or more base stations; determine, based at least partly on the received information, one or more virtual power plant actions or one or more peak shaving actions associated with at least one base station of the one or more base stations; and initiate the one or more virtual power plant actions or the one or more peak shaving actions.

According to another aspect, there is provided an apparatus comprising: means for receiving, from an application or function, information indicating at least one of: one or more actions performed or predicted to be performed by the application or function, or one or more key performance indicators indicating an impact or predicted impact of the one or more actions, the one or more actions causing a change in at least one of: communication traffic associated with the one or more base stations, or power consumption of the one or more base stations or one or more subcomponents of the one or more base stations; means for determining, based at least partly on the received information, one or more virtual power plant actions or one or more peak shaving actions associated with at least one base station of the one or more base stations; and means for initiating the one or more virtual power plant actions or the one or more peak shaving actions.

According to another aspect, there is provided a method comprising: receiving, from an application or function, information indicating at least one of: one or more actions performed or predicted to be performed by the application or function, or one or more key performance indicators indicating an impact or predicted impact of the one or more actions, the one or more actions causing a change in at least one of: communication traffic associated with the one or more base stations, or power consumption of the one or more base stations or one or more subcomponents of the one or more base stations; determining, based at least partly on the received information, one or more virtual power plant actions or one or more peak shaving actions associated with at least one base station of the one or more base stations; and initiating the one or more virtual power plant actions or the one or more peak shaving actions.

According to another aspect, there is provided a computer program comprising instructions which, when executed by an apparatus, cause the apparatus to perform at least the following: receiving, from an application or function, information indicating at least one of: one or more actions performed or predicted to be performed by the application or function, or one or more key performance indicators indicating an impact or predicted impact of the one or more actions, the one or more actions causing a change in at least one of: communication traffic associated with the one or more base stations, or power consumption of the one or more base stations or one or more subcomponents of the one or more base stations; determining, based at least partly on the received information, one or more virtual power plant actions or one or more peak shaving actions associated with at least one base station of the one or more base stations; and initiating the one or more virtual power plant actions or the one or more peak shaving actions.

According to another aspect, there is provided a computer readable medium comprising program instructions which, when executed by an apparatus, cause the apparatus to perform at least the following: receiving, from an application or function, information indicating at least one of: one or more actions performed or predicted to be performed by the application or function, or one or more key performance indicators indicating an impact or predicted impact of the one or more actions, the one or more actions causing a change in at least one of: communication traffic associated with the one or more base stations, or power consumption of the one or more base stations or one or more subcomponents of the one or more base stations; determining, based at least partly on the received information, one or more virtual power plant actions or one or more peak shaving actions associated with at least one base station of the one or more base stations; and initiating the one or more virtual power plant actions or the one or more peak shaving actions.

According to another aspect, there is provided a non-transitory computer readable medium comprising program instructions which, when executed by an apparatus, cause the apparatus to perform at least the following: receiving, from an application or function, information indicating at least one of: one or more actions performed or predicted to be performed by the application or function, or one or more key performance indicators indicating an impact or predicted impact of the one or more actions, the one or more actions causing a change in at least one of: communication traffic associated with the one or more base stations, or power consumption of the one or more base stations or one or more subcomponents of the one or more base stations; determining, based at least partly on the received information, one or more virtual power plant actions or one or more peak shaving actions associated with at least one base station of the one or more base stations; and initiating the one or more virtual power plant actions or the one or more peak shaving actions.

According to another aspect, there is provided an apparatus comprising at least one processor, and at least one memory storing instructions that, when executed by the at least one processor, cause the apparatus at least to: receive input information from a virtual power plant controller; determine, based on the input information, one or more actions causing a change in at least one of: communication traffic associated with one or more base stations, or power consumption of the one or more base stations or one or more subcomponents of the one or more base stations; and perform the one or more actions.

According to another aspect, there is provided an apparatus comprising: means for receiving input information from a virtual power plant controller; means for determining, based on the input information, one or more actions causing a change in at least one of: communication traffic associated with one or more base stations, or power consumption of the one or more base stations or one or more subcomponents of the one or more base stations; and means for performing the one or more actions.

According to another aspect, there is provided a method comprising: receiving input information from a virtual power plant controller; determining, based on the input information, one or more actions causing a change in at least one of: communication traffic associated with one or more base stations, or power consumption of the one or more base stations or one or more subcomponents of the one or more base stations; and performing the one or more actions.

According to another aspect, there is provided a computer program comprising instructions which, when executed by an apparatus, cause the apparatus to perform at least the following: receiving input information from a virtual power plant controller; determining, based on the input information, one or more actions causing a change in at least one of: communication traffic associated with one or more base stations, or power consumption of the one or more base stations or one or more subcomponents of the one or more base stations; and performing the one or more actions.

According to another aspect, there is provided a computer readable medium comprising program instructions which, when executed by an apparatus, cause the apparatus to perform at least the following: receiving input information from a virtual power plant controller; determining, based on the input information, one or more actions causing a change in at least one of: communication traffic associated with one or more base stations, or power consumption of the one or more base stations or one or more subcomponents of the one or more base stations; and performing the one or more actions.

According to another aspect, there is provided a non-transitory computer readable medium comprising program instructions which, when executed by an apparatus, cause the apparatus to perform at least the following: receiving input information from a virtual power plant controller; determining, based on the input information, one or more actions causing a change in at least one of: communication traffic associated with one or more base stations, or power consumption of the one or more base stations or one or more subcomponents of the one or more base stations; and performing the one or more actions.

LIST OF DRAWINGS

In the following, various example embodiments will be described in greater detail with reference to the accompanying drawings, in which FIG. 1 illustrates an example of a wireless communication network;

DETAILED DESCRIPTION

The following embodiments are exemplifying. Although the specification may refer to "an", "one", or "some" embodiment(s) in several locations of the text, this does not necessarily mean that each reference is made to the same embodiment(s), or that a particular feature only applies to a single embodiment. Single features of different embodiments may also be combined to provide other embodiments.

Some example embodiments described herein may be implemented in a wireless communication network comprising a radio access network based on one or more of the following radio access technologies: Global System for Mobile Communications (GSM) or any other second generation radio access technology, Universal Mobile Telecommunication System (UMTS, 3G) based on basic wideband-code division multiple access (W-CDMA), high-speed packet access (HSPA), Long Term Evolution (LTE), LTE-Advanced, fourth generation (4G), fifth generation (5G), 5G new radio (NR), 5G-Advanced (i.e., 3GPP NR Rel-18 and beyond), or sixth generation (6G). Some examples of radio access networks include the universal mobile telecommunications system (UMTS) radio access network (UTRAN), the Evolved Universal Terrestrial Radio Access network (E-UTRA), or the next generation radio access network (NG-RAN). The wireless communication network may further comprise a core network, and some example embodiments may also be applied to network functions of the core network.

It should be noted that the embodiments are not restricted to the wireless communication network given as an example, but a person skilled in the art may also apply the solution to other wireless communication networks or systems provided with necessary properties. For example, some example embodiments may also be applied to a communication system based on IEEE 802.11 specifications, or a communication system based on IEEE 802.15 specifications.

Figure 1:
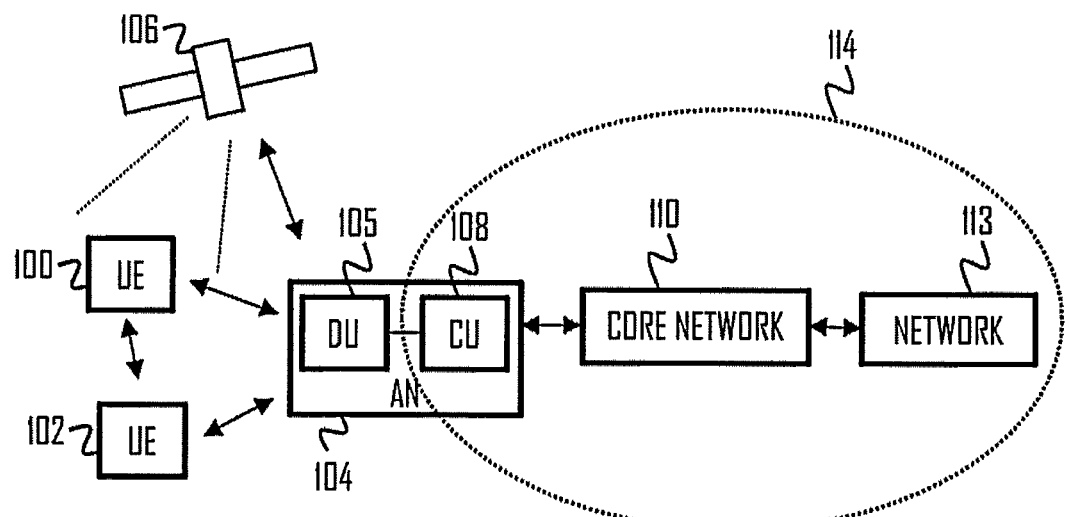

FIG. 1 depicts an example of a simplified wireless communication network showing some physical and logical entities. The connections shown in FIG. 1 may be physical connections or logical connections. It is apparent to a person skilled in the art that the wireless communication network may also comprise other physical and logical entities than those shown in FIG. 1.

The example embodiments described herein are not, however, restricted to the wireless communication network given as an example but a person skilled in the art may apply the embodiments described herein to other wireless communication networks provided with necessary properties.

The example wireless communication network shown in FIG. 1 includes an access network, such as a radio access network (RAN), and a core network 110.

FIG. 1 shows user equipment (UE) 100, 102 configured to be in a wireless connection on one or more communication channels in a radio cell with an access node (AN) 104 of an access network. The AN 104 may be an evolved Node B (abbreviated as eNB or eNodeB) or a next generation Node B (abbreviated as gNB or gNodeB), providing the radio cell. The wireless connection (e.g., radio link) from a UE to the access node 104 may be called uplink (UL) or reverse link, and the wireless connection (e.g., radio link) from the access node to the UE may be called downlink (DL) or forward link. UE 100 may also communicate directly with UE 102, and vice versa, via a wireless connection generally referred to as a sidelink (SL). It should be appreciated that the access node 104 or its functionalities may be implemented by using any node, host, server or access point etc. entity suitable for providing such functionalities.

The access network may comprise more than one access node, in which case the access nodes may also be configured to communicate with one another over links, wired or wireless. These links between access nodes may be used for sending and receiving control plane signaling and also for routing data from one access node to another access node.

The access node may comprise a computing device configured to control the radio resources of the access node. The access node may also be referred to as a base station, a base transceiver station (BTS), an access point, a cell site, a radio access node or any other type of node capable of being in a wireless connection with a UE (e.g., UEs 100, 102). The access node may include or be coupled to transceivers. From the transceivers of the access node, a connection may be provided to an antenna unit that establishes bi-directional radio links to UEs 100, 102. The antenna unit may comprise an antenna or antenna element, or a plurality of antennas or antenna elements.

The access node 104 may further be connected to a core network (CN) 110. The core network 110 may comprise an evolved packet core (EPC) network and/or a $5^{th}$ generation core network (5GC). The EPC may comprise network entities, such as a serving gateway (S-GW for routing and forwarding data packets), a packet data network gateway (P-GW) for providing connectivity of UEs to external packet data networks, and a mobility management entity (MME). The 5GC may comprise network functions, such as a user plane function (UPF), an access and mobility management function (AMF), and a location management function (LMF).

The core network 110 may also be able to communicate with one or more external networks 113, such as a public switched telephone network or the Internet, or utilize services provided by them. For example, in 5G wireless communication networks, the UPF of the core network 110 may be configured to communicate with an external data network via an N6 interface. In LTE wireless communication networks, the P-GW of the core network 110 may be configured to communicate with an external data network.

The illustrated UE 100, 102 is one type of an apparatus to which resources on the air interface may be allocated and assigned. The UE 100, 102 may also be called a wireless communication device, a subscriber unit, a mobile station, a remote terminal, an access terminal, a user terminal, a terminal device, or a user device just to mention but a few names. The UE may be a computing device operating with or without a subscriber identification module (SIM), including, but not limited to, the following types of computing devices: a mobile phone, a smartphone, a personal digital assistant (PDA), a handset, a computing device comprising a wireless modem (e.g., an alarm or measurement device, etc.), a laptop computer, a desktop computer, a tablet, a game console, a notebook, a multimedia device, a reduced capability (RedCap) device, a wearable device (e.g., a watch, earphones or eyeglasses) with radio parts, a sensor comprising a wireless modem, or any computing device comprising a wireless modem integrated in a vehicle.

It should be appreciated that a UE may also be a nearly exclusive uplink-only device, of which an example may be a camera or video camera loading images or video clips to a network. A UE may also be a device having capability to operate in an Internet of Things (IoT) network, which is a scenario in which objects may be provided with the ability to transfer data over a network without requiring human-to-human or human-to-computer interaction. The UE may also utilize cloud. In some applications, the computation may be carried out in the cloud or in another UE.

The wireless communication network may also be able to support the usage of cloud services, for example at least part of core network operations may be carried out as a cloud service (this is depicted in FIG. 1 by "cloud" 114). The communication system may also comprise a central control entity, or the like, providing facilities for wireless communication networks of different operators to cooperate for example in spectrum sharing.

Various techniques described herein may also be applied to a cyber-physical system (CPS) (a system of collaborating computational elements controlling physical entities). CPS may enable the implementation and exploitation of massive amounts of interconnected ICT devices (sensors, actuators, processors microcontrollers, etc.) embedded in physical objects at different locations. Mobile cyber physical systems, in which the physical system in question may have inherent mobility, are a subcategory of cyber-physical systems. Examples of mobile physical systems include mobile robotics and electronics transported by humans or animals.

5G enables using multiple input-multiple output (MIMO) antennas in the access node 104 and/or the UE 100, 102, many more base stations or access nodes than an LTE network (a so-called small cell concept), including macro sites operating in co-operation with smaller stations and employing a variety of radio technologies depending on service needs, use cases and/or spectrum available. 5G wireless communication networks may support a wide range of use cases and related applications including video streaming, augmented reality, different ways of data sharing and various forms of machine type applications, such as (massive) machine-type communications (mMTC), including vehicular safety, different sensors and real-time control.

In 5G wireless communication networks, access nodes and/or UEs may have multiple radio interfaces, namely below 6 GHz, cmWave and mmWave, and also being integrable with existing legacy radio access technologies, such as the LTE. Integration with the LTE may be implemented, for example, as a system, where macro coverage may be provided by the LTE, and 5G radio interface access may come from small cells by aggregation to the LTE. In other words, a 5G wireless communication network may support both inter-RAT operability (such as LTE-5G) and inter-RI operability (inter-radio interface operability, such as below 6 GHz-cmWave-mmWave). One of the concepts considered to be used in 5G wireless communication networks may be network slicing, in which multiple independent and dedicated virtual sub-networks (network instances) may be created within the substantially same infrastructure to run services that have different requirements on latency, reliability, throughput and mobility.

5G may enable analytics and knowledge generation to occur at the source of the data. This approach may involve leveraging resources that may not be continuously connected to a network, such as laptops, smartphones, tablets and sensors. Multi-access edge computing (MEC) may provide a distributed computing environment for application and service hosting. It may also have the ability to store and process content in close proximity to cellular subscribers for faster response time. Edge computing may cover a wide range of technologies, such as wireless sensor networks, mobile data acquisition, mobile signature analysis, cooperative distributed peer-to-peer ad hoc networking and processing also classifiable as local cloud/fog computing and grid/mesh computing, dew computing, mobile edge computing, cloudlet, distributed data storage and retrieval, autonomic self-healing networks, remote cloud services, augmented and virtual reality, data caching, Internet of Things (massive connectivity and/or latency critical), critical communications (autonomous vehicles, traffic safety, real-time analytics, time-critical control, healthcare applications).

In some example embodiments, an access node (e.g., access node 104) may comprise: a radio unit (RU) comprising a radio transceiver (TRX), i.e., a transmitter (Tx) and a receiver (Rx); one or more distributed units (DUs) 105 that may be used for the so-called Layer 1 (L1) processing and real-time Layer 2 (L2) processing; and a central unit (CU) 108 (also known as a centralized unit) that may be used for non-real-time L2 and Layer 3 (L3) processing. The CU 108 may be connected to the one or more DUs 105 for example via an F1 interface. Such an embodiment of the access node may enable the centralization of CUs relative to the cell sites and DUs, whereas DUs may be more distributed and may even remain at cell sites. The CU and DU together may also be referred to as baseband or a baseband unit (BBU). The CU and DU may also be comprised in a radio access point (RAP).

The CU 108 may be a logical node hosting radio resource control (RRC), service data adaptation protocol (SDAP) and/or packet data convergence protocol (PDCP), of the NR protocol stack for an access node. The DU 105 may be a logical node hosting radio link control (RLC), medium access control (MAC) and/or physical (PHY) layers of the NR protocol stack for the access node. The operations of the DU may be at least partly controlled by the CU. It should also be understood that the distribution of functions between DU 105 and CU 108 may vary depending on implementation. The CU may comprise a control plane (CU-CP), which may be a logical node hosting the RRC and the control plane part of the PDCP protocol of the NR protocol stack for the access node. The CU may further comprise a user plane (CU-UP), which may be a logical node hosting the user plane part of the PDCP protocol and the SDAP protocol of the CU for the access node.

Cloud computing systems may also be used to provide the CU 108 and/or DU 105. A CU provided by a cloud computing system may be referred to as a virtualized CU (vCU). In addition to the vCU, there may also be a virtualized DU (vDU) provided by a cloud computing system. Furthermore, there may also be a combination, where the DU may be implemented on so-called bare metal solutions, for example application-specific integrated circuit (ASIC) or customer-specific standard product (CSSP) system-on-a-chip (SoC).

Edge cloud may be brought into the access network (e.g., RAN) by utilizing network function virtualization (NFV) and software defined networking (SDN). Using edge cloud may mean access node operations to be carried out, at least partly, in a computing system operationally coupled to a remote radio head (RRH) or a radio unit (RU) of an access node. It is also possible that access node operations may be performed on a distributed computing system or a cloud computing system located at the access node. Application of cloud RAN architecture enables RAN real-time functions being carried out at the access network (e.g., in a DU 105) and non-real-time functions being carried out in a centralized manner (e.g., in a CU 108).

It should also be understood that the distribution of functions between core network operations and access node operations may differ in future wireless communication networks compared to that of the LTE or 5G, or even be non-existent. Some other technology advancements that may be used include big data and all-IP, which may change the way wireless communication networks are being constructed and managed. 5G (or new radio, NR) wireless communication networks may support multiple hierarchies, where multi-access edge computing (MEC) servers may be placed between the core network 110 and the access node 104. It should be appreciated that MEC may be applied in LTE wireless communication networks as well.

A 5G wireless communication network ("5G network") may also comprise a non-terrestrial communication network, such as a satellite communication network, to enhance or complement the coverage of the 5G radio access network. For example, satellite communication may support the transfer of data between the 5G radio access network and the core network, enabling more extensive network coverage. Possible use cases may be providing service continuity for machine-to-machine (M2M) or Internet of Things (IoT) devices or for passengers on board of vehicles, or ensuring service availability for critical communications, and future railway/maritime/aeronautical communications. Satellite communication may utilize geostationary earth orbit (GEO) satellite systems, but also low earth orbit (LEO) satellite systems, in particular mega-constellations (systems in which hundreds of (nano) satellites are deployed). A given satellite 106 in the mega-constellation may cover several satellite-enabled network entities that create on-ground cells. The on-ground cells may be created through an on-ground relay access node or by an access node 104 located on-ground or in a satellite.

It is obvious for a person skilled in the art that the access node 104 depicted in FIG. 1 is just an example of a part of an access network (e.g., a radio access network) and in practice, the access network may comprise a plurality of access nodes, the UEs 100, 102 may have access to a plurality of radio cells, and the access network may also comprise other apparatuses, such as physical layer relay access nodes or other entities. At least one of the access nodes may be a Home eNodeB or a Home gNodeB. A Home gNodeB or a Home eNodeB is a type of access node that may be used to provide indoor coverage inside a home, office, or other indoor environment.

Additionally, in a geographical area of an access network (e.g., a radio access network), a plurality of different kinds of radio cells as well as a plurality of radio cells may be provided. Radio cells may be macro cells (or umbrella cells) which may be large cells having a diameter of up to tens of kilometers, or smaller cells such as micro-, femto- or pico-cells. The access node(s) of FIG. 1 may provide any kind of these cells. A cellular radio network may be implemented as a multilayer access networks including several kinds of radio cells. In multilayer access networks, one access node may provide one kind of a radio cell or radio cells, and thus a plurality of access nodes may be needed to provide such a multilayer access network.

For fulfilling the need for improving performance of access networks, the concept of "plug-and-play" access nodes may be introduced. An access network which may be able to use "plug-and-play" access nodes, may include, in addition to Home eNodeBs or Home gNodeBs, a Home Node B gateway, or HNB-GW (not shown in FIG. 1). An HNB-GW, which may be installed within an operator's access network, may aggregate traffic from a large number of Home eNodeBs or Home gNodeBs back to a core network of the operator.

Energy systems are currently under a major change due to climate change and geopolitical reasons. Renewable energy is becoming a mainstream solution due to gradual reduction of energy resources, whose burning produces carbon dioxide. Renewable energy resources include solar and wind power, for example. As the availability of these renewable energy resources may be intermittent (e.g., due to changes in weather), it may be necessary to store the energy by using batteries, for example.

Some example embodiments relate to a concept called virtual power plant (VPP). VPP refers to fast frequency reserve (FFR) and frequency containment reserve (FCR) markets that a transmission system operator (TSO) has established in order to support the stability of a power grid. This may be beneficial in balancing the electricity supply and demand of the power grid. If there is an imbalance, the grid frequency tends to differ from the nominal value (e.g., 50 or 60 Hz). In the worst case, an imbalance in the power grid may result in catastrophic consequences, such as permanent damage to the power generating equipment.

To balance the power grid, it is possible to provide extra power to the power grid for example by starting some reserve power plants. It is also possible to reduce the power production in case overproduction is taking place. However, there is usually some delay associated with these actions. The idea of VPP is to create a marketplace, where for a short duration (e.g., until the actual reserve power plants start producing power), some external resources, such as base station batteries, are used so that the grid frequency is restored to its nominal value instantly or at least almost instantly. For this behavior, the TSO may compensate the external parties who own these external resources.

While a base station of a wireless communication network may use the power grid as its main power source, the base station may comprise one or more batteries as a back-up power source that may be used during power outages, for example. The back-up batteries of one or more base stations may be organized as a virtual power plant that can be operated as a separate entity or integrated to a VPP of a TSO. Such a scheme may also be referred to as a radio network virtual power plant herein. As a non-limiting example, the back-up battery capacity of a single base station may be approximately 400 ampere-hours (Ah) at 48 volts (V). Thus, assuming for example 10 million base stations globally, the back-up battery capacity of these base stations would be approximately 100 gigawatt hours (GWh) in total.

When discharging a battery of a base station, the discharged energy can be used to operate the base station (i.e., using the battery as a power source instead of the power grid). Alternatively, the discharged energy can be provided back to the power grid, if the base station power system comprises a power supply with an inverter. For example, the battery of the base station may be charged from the power grid at night (during lower energy demand), and then discharged during daytime (when energy demand is higher). As another example, the discharging may be started when electricity supply and demand are not matching, as indicated by the measured frequency of the power grid. The frequency of the power grid may be lower when energy demand is high compared to supply, and the frequency may be higher when energy demand is low compared to supply. The discharging may be done when the base station is operating in a normal state, i.e., when no alarms are triggered that would prevent discharge.

Alternatively, the battery of one base station may be discharged to a battery of another base station or to operate the other base station. For example, during daytime (during higher energy demand) energy may be transferred from a "residential" base station to a "business center" base station. On the other hand, during the night (during lower energy demand), energy may be transferred from the "business center" base station to the "residential" base station. In this case, the transfer is a battery-to-battery transfer in direct current (DC).

However, the amount of discharged energy may need to be limited, so that the remaining battery level meets regulatory requirements. For example, regulatory requirements may require that the base station is able to operate for at least two to four hours on battery power (e.g., in case of a power outage). It should be noted that the specific amount of time in the regulatory requirements may vary in different geographical areas or countries. As the regulatory requirements for the minimum time for battery operation may vary based on geographical area, a location-based service may be used to determine the needed action.

The sufficient battery level to meet the regulatory requirements may be determined based on the historical information of the base station, for example regarding its data traffic (e.g., at different times of the day, days of the week, holidays, events, etc.). The data traffic history of the base station may be collected by a network management system (NMS) or other network element or application in the operator's network. The NMS is a server that uses FCAPS (fault, configuration, accounting, performance and security) information to manage a data network. The network management system may also be referred to as a network management station or network management tools. In addition to network key performance indicators (KPIs), the decision may involve other KPIs, such as measurements for the power consumption of the base station. When discharging energy from the batteries to the power grid, the time to recharge the batteries may also be taken into account.

The decision-making architecture for VPP use may be centralized (e.g., NMS provides charging/discharging instructions to the base station), distributed (e.g., the base station itself or its battery control unit makes the decisions independently) or based on a hybrid model (e.g., the NMS and the base station may both be involved in the decision-making).

The decision-making entity (e.g., NMS) may collect information about electricity price, battery levels, data traffic estimates, alarms, configurations and so on, and based on them decides the best time when to use batteries to operate the base station or another base station or to discharge to the power grid, or when to charge the batteries. When forecasting the best time and duration for the above actions, other sources such as event calendars, weather forecast, and so on, may also be used. This data may be available from the internet, for example. The decision-making entity may also take the power grid status into account. The power grid status may be received from the power grid, or the base station may measure the status from frequency measurements of the power grid.

VPP may involve a day-ahead bidding market, where external approved power suppliers and/or consumers are telling the price at which they are willing to act, when needed to either reduce their consumption or to increase it. As mentioned above, it is also possible to inject power from the base station batteries to the power grid, if the base station power system comprises a power supply with an inverter. If and when the need for VPP occurs, the TSO signals the bidder (provided that an agreement has been reached between the bidder and the TSO) that now is the time to act.

For example, in case the demand exceeds the supply in the power grid, the communications system provider (CSP) may off-load the base stations from the power grid, i.e., switch the base stations to temporarily operate on back-up battery power instead of drawing power from the power grid. This, in turn, helps to balance the power grid.

However, if there is a situation, where there is an excess amount of power generation, the possibility to increase the power consumption may be somewhat limited in case of base stations. One potential way to do that is to start charging the batteries in addition to running the base stations with grid power.

FFR requires fast reaction times (e.g., 0.7 to 1.3 seconds), and the duration of the action may be short (e.g., up to 30 seconds). FCR consists of two markets: FCR-D (D for disturbance) and FCR-N(N for normal). FCR-D requires relatively fast reaction times (e.g., 5 seconds), whereas for FCR-N a slower reaction time (e.g., 3 minutes) may be acceptable. In both FCR-N and FCR-D, the maximum operation time (i.e., duration of the action) may be longer than FFR (e.g., 30 minutes in FCR-N and FCR-D).

In order to qualify for the marketplace, there may be some minimum power capacity requirements. For example, for FFR and FCR-D, 1 megawatt (MW) of power capacity may be required. For FCR-N, 100 kilowatts (KW) may be sufficient in order to meet the TSO's needs. These example requirements originate from the Fingrid guideline, but similar guidelines may be associated with other TSOs as well. To meet these requirements, an aggregation of multiple base station back-up battery resources may be needed, since the power consumption of a single base station may be in the range of just 2-5 KW, which cannot alone meet the relatively high power requirement.

Whereas VPP is about a bidding market, where a TSO is compensating for a short duration of off-loading base stations from the power grid to balance the supply and demand in the power grid, peak shaving is about making use of electricity price fluctuation. The idea of peak shaving is quite straight-forward: charge the batteries when the electricity price is low, and off-load from the power grid by using the battery power when the price is high. In case of VPP, the CSP needs an aggregation platform and needs to participate into the auction market set up by the TSO. However, peak shaving is a much simpler approach, where there is no need for aggregation or TSO involvement. For peak shaving, the CSPs themselves can decide and act, when the advantages in the energy market in terms of electricity price fluctuation are visible. For example, peak shaving may be implemented by charging batteries during night time when the electricity price is usually lower, and discharging the batteries during day time when the electricity price is usually higher.

The technological development in battery chemistry has resulted in moving from lead-acid batteries to lithium-ion (Li-ion) batteries, which have a much higher energy density compared to lead-acid batteries. Lithium-ion batteries are also beneficial due to their capability to handle cyclic loading. The same applies also in peak shaving use. Lead-acid batteries may not be as suitable as Li-ion batteries for peak shaving use, as the performance of lead-acid batteries tends to deteriorate quickly under cyclic loading.

However, in case of VPP, the discharge times may be relatively short, for example in the case of FFR, where the maximum discharge time may be just 30 seconds. Such a short discharge time has a negligible impact on battery lifetime. Currently, also the yearly number of FFR occurrences is relatively low (e.g., tens of occurrences per year). Therefore, FFR use is not a threat for batteries, be it either lead-acid or Li-ion. However, in case of FCR, the maximum discharge time may be 30 minutes, which may already have a negative impact both on battery durability and be a threat for the government-set minimum back-up time. However, even in case of FCR, the discharge times are usually just 2-5 minutes.

For FCR, one should still be prepared for 30-minute discharge times. One option to solve this requirement is to reserve enough extra battery capacity, so that both the government regulation requirement for back-up batteries (e.g., 2-4 hours) and the FCR requirement of 30 minutes are simultaneously fulfilled. Another option would be to pool some extra base station resources for the purpose. For example, in this case, a first set of base stations may be off-loaded for the first 5 minutes, and if the need for off-loading continues, then another set of base stations may be offloaded for another 5 minutes after that, and so on. By doing so, the base station back-up battery dimensioning would solely depend on the government-regulated minimum capacity (possibly with some slight overhead to run the base station on battery power for an extra 5 minutes). By doing so, the currently installed base station back-up batteries could be used without having to upgrade or significantly over-dimension the back-up batteries.

It is also possible for base station batteries to be over-dimensioned for VPP or peak shaving purposes. The over-dimensioning means that the battery capacity may be larger than normally used for base stations (without VPP or peak shaving use). This gives more flexibility to use batteries for VPP or peak shaving purposes as described herein.

In VPP and peak shaving concepts for mobile networks, the amount of reserve or battery capacity and the duration of battery-based operation can be estimated based on data traffic or power consumption profiles (or other estimates for the given time frame). Data traffic and power consumption profiles may be made based on the history of measurements, counters or KPIs from base stations, or in some cases directly from the power system.

Different applications and functions in base stations, network management system and/or RAN intelligent controller (RIC) may trigger changes that alter data traffic and power consumption profiles in a base station. If a RAN, RIC, NMS application or function changes parameters in a certain base station, it may have impact to the data traffic and/or power consumption profiles of neighboring base stations as well.

Even though history-based traffic profiles and power consumption profiles may provide a good estimate on the available reserve capacity, they may become obsolete with short notice, if other functions in the system (dynamically) change the base station configuration. Such changes should be taken into account, when decisions for VPP and/or peak shaving are made, such as the amount or duration of battery-based operation or exclusion or inclusion of base station sites for VPP or peak shaving actions. In addition, those functions may change the instantaneous power consumption in the base station.

A traffic profile of a base station refers to a description of the expected traffic characteristics of a particular service or application, including its data rate, latency, jitter, and packet loss requirements. It may also include information on the expected number of users, their location, and the duration of their sessions. Herein the traffic may refer to network traffic (also called communication traffic or data traffic).

A traffic profile of a base station may also include aggregated traffic over all or many services. This may represent the combined traffic of all services and applications handled by the base station. By analyzing the aggregated traffic, network operators can get an overall view of the base station's utilization, capacity, and performance. This can help in identifying bottlenecks, planning for future capacity expansions, and optimizing resource allocation across different services.

Furthermore, there may be service-specific traffic profiles for different types of services, such as speech, best effort, streaming, etc. The service-specific traffic profiles provide a detailed view of the traffic patterns and requirements for specific services. In the context of 3GPP specifications, the service-specific traffic profiles can be defined based on quality of service class identifiers (QCI) (in LTE) or 5G quality of service identifiers (5QI), which indicate the quality of service (Qos) requirements for different types of services. Service-specific traffic profiles can help network operators in allocating resources and prioritizing services based on their QoS requirements, such as latency, reliability, and throughput.

A power consumption profile of a base station is a characterization of how much power the base station consumes over a period of time under different conditions. It can be used to understand the energy usage patterns of the base station, which can help to optimize the energy usage of the base station.

For example, the power consumption profile may include information about the base station's energy usage during different times of the day, different weather conditions, different levels of network traffic, and other factors that may affect the energy consumption of the base station.

Some examples of applications or functions that may alter the traffic and/or power consumption profiles are energy saving management (ESM), traffic steering, mobility load balancing, capacity and coverage optimization, handover optimization, and mobility robustness optimization. Any functionality that changes the load and data traffic in a cell, or changes load distribution across cells, applies as a function that may benefit from interactions with the VPP controller.

The VPP controller refers to a decision-making entity that makes decisions for VPP actions and/or peak shaving actions.

ESM is a function that controls base station resources in order to save energy. For example, ESM may switch off radio layers (e.g., macro or small cell, 2G, 3G, 4G, or 5G) or dynamically mute transmitter and/or receiver paths to save energy in low load conditions. This has an impact on the power consumption of the base station and may therefore distort power consumption profiles created for VPP purposes. ESM works in a near-real-time (near-RT) fashion, and therefore its impact cannot be forecasted based on history.

Some possible problems due to lack of interactions between VPP or peak shaving and other functions are presented in the following.

Problem 1: VPP selects incorrect sites for VPP or peak shaving, if the traffic profiles or power consumption profiles are incorrect due to changes caused by ESM.

Problem 2: Battery duration during peak shaving or FCR is (too) short and can be improved by optimizing (minimizing) power consumption with ESM.

Problem 3: Currently, energy saving is optimized based on data traffic, but the cost of energy is not taken into account. Currently, ESM and VPP or peak shaving are separately optimized.

Problem 4: Available renewable capacity (e.g., solar) in the site is not taken into account by ESM.

Problem 5: The regulator may demand batteries to be recharged within a given time limit during active operation of the base station (e.g., 80% charge level within 24 hours is a Traficom requirement in Finland). In order to meet this requirement, base station power consumption may need to be reduced with ESM.

Problem 6: It is difficult to maintain power consumption at a stable level due to changing data traffic in case of VPP regulation market.

Some example embodiments define what kind of information between ESM (or other function causing changes to traffic profiles and power consumption profiles) and VPP or peak shaving is needed in order to enable interoperability between them.

Some example embodiments are described below using principles and terminology of 5G technology without limiting the example embodiments to 5G communication systems, however. Furthermore, in the following, ESM is used as an example for describing some example embodiments. However, as mentioned above, some example embodiments are not limited to ESM, and they may be applied to any function that is capable of altering the traffic profile and/or power consumption profile of one or more base stations.

Figure 2A:
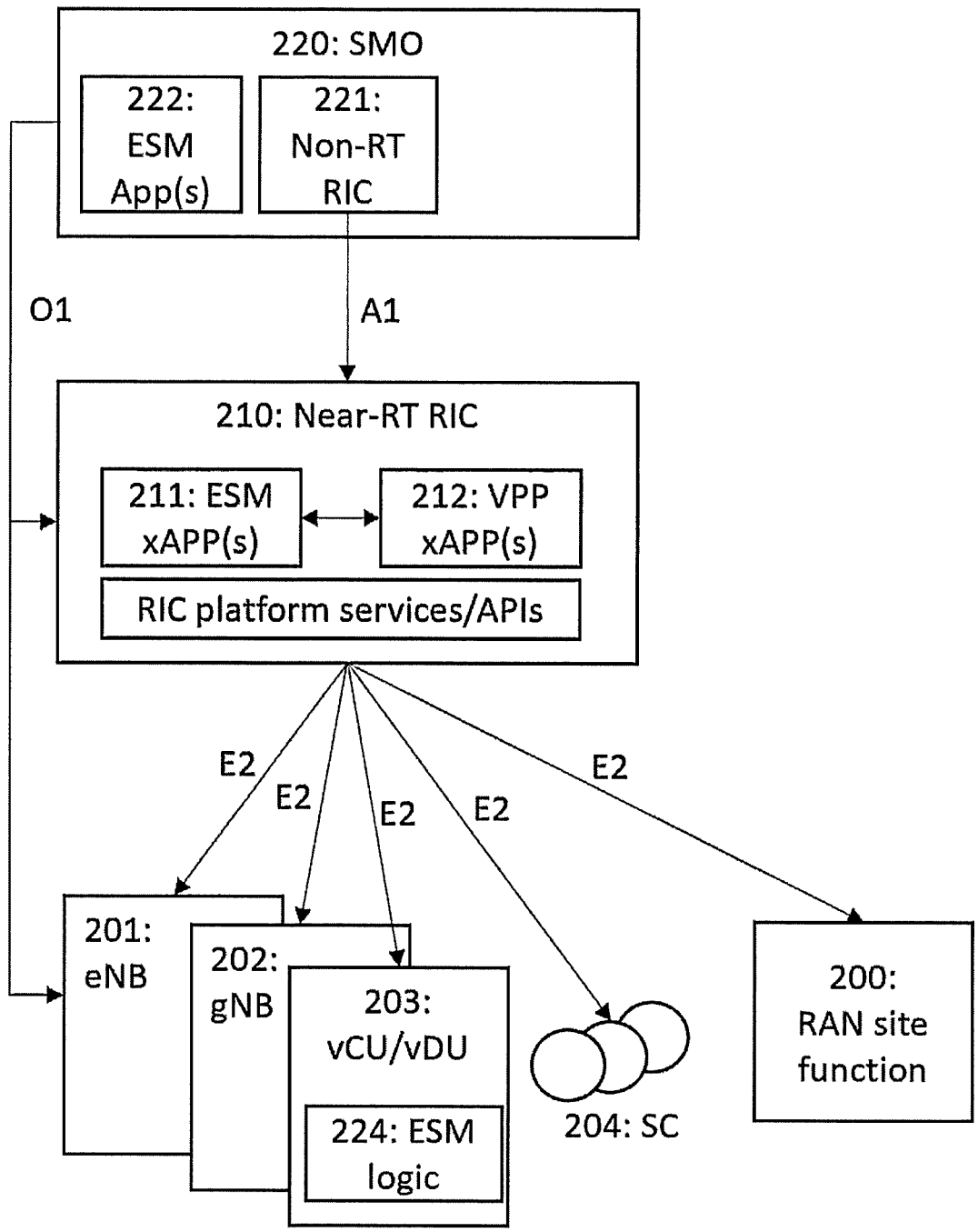
FIG. 2A illustrates an example of a system.
Figure 2B:
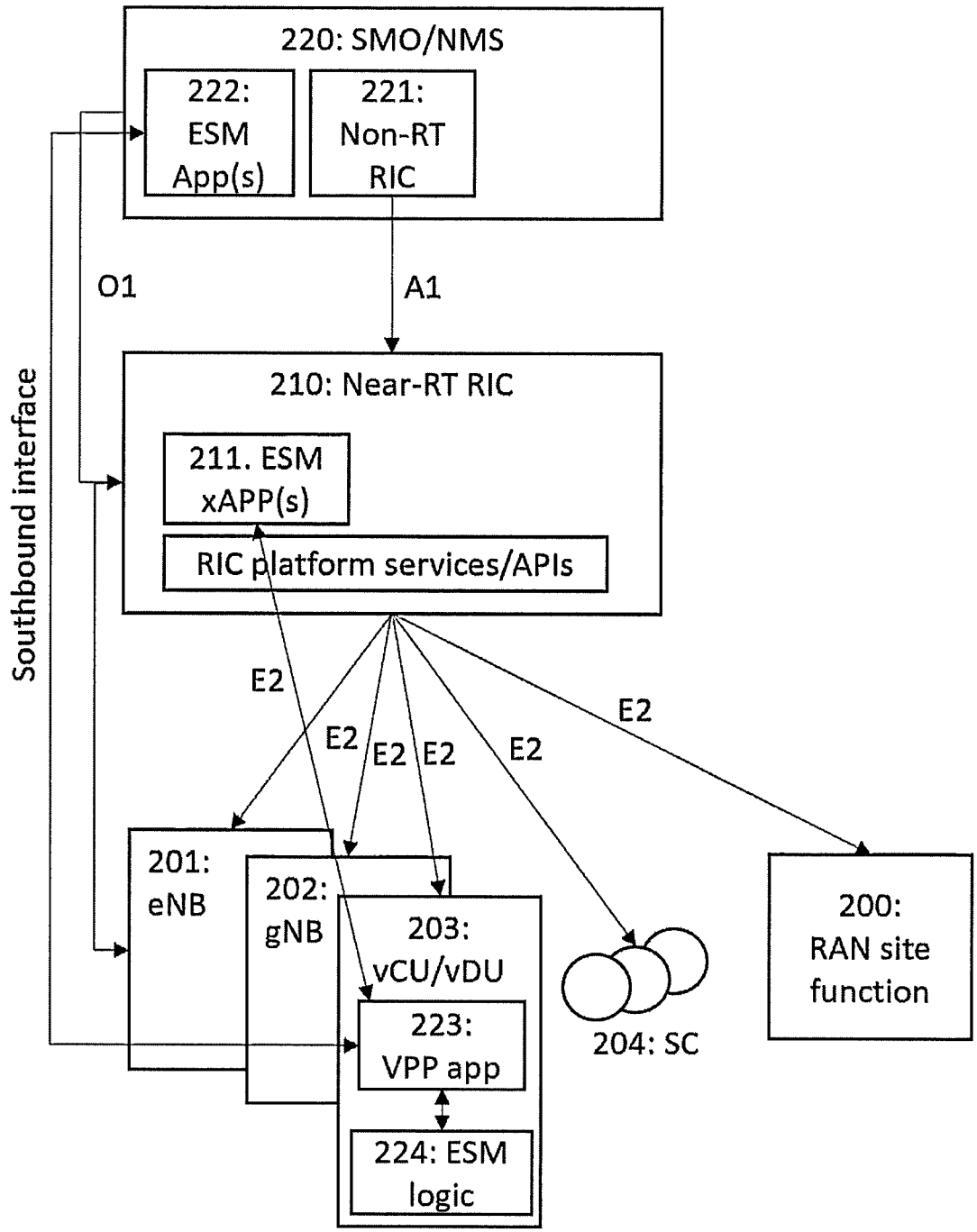
FIG. 2B illustrates an example of a system.
Figure 2C:
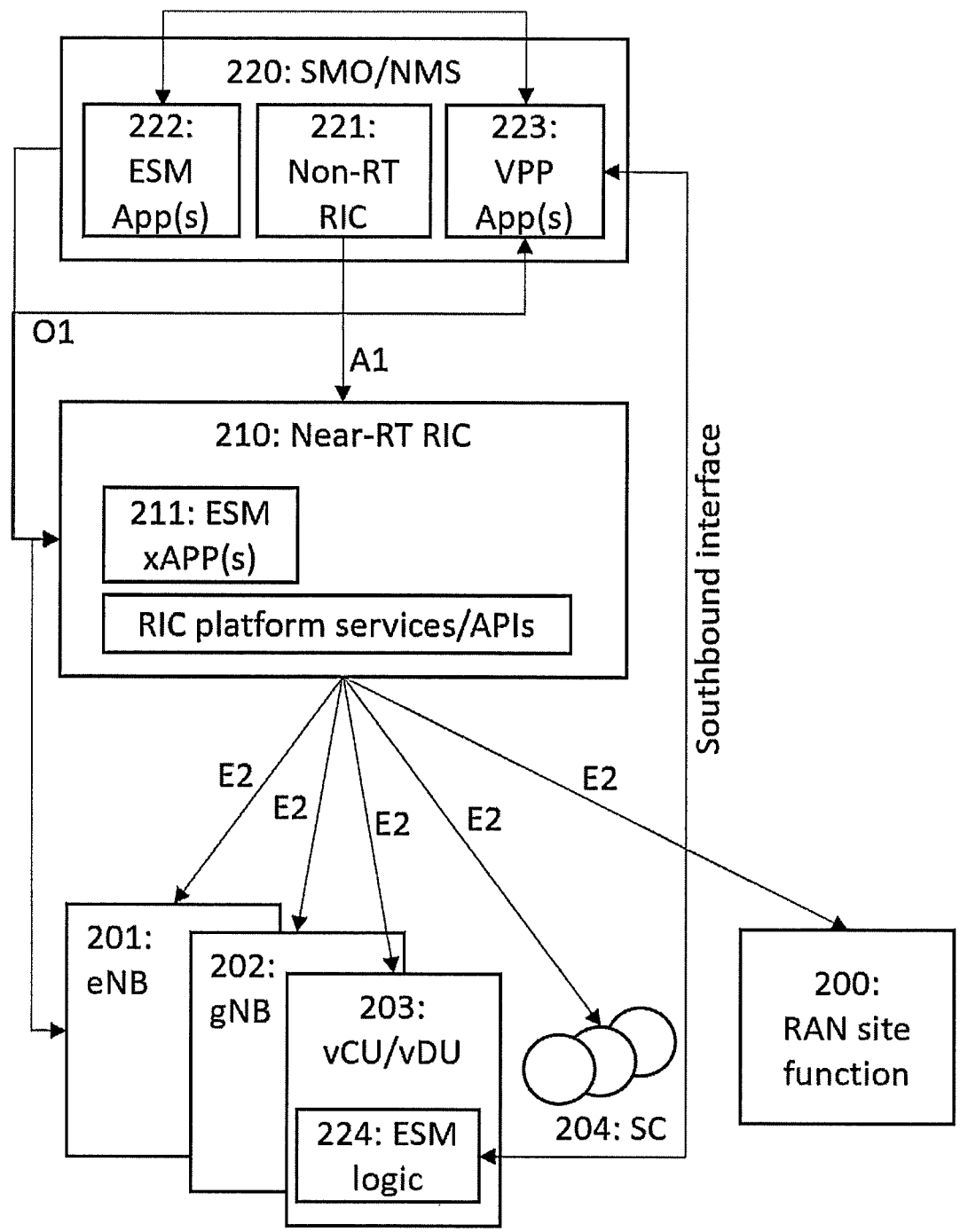
FIG. 2C illustrates an example of a system.

FIG. 2A, FIG. 2B and FIG. 2C illustrate some examples of systems involving interactions between ESM and VPP or peak shaving. However, it should be noted that some example embodiments are not limited to these examples, and other options are also possible.

FIG. 2A illustrates open radio access network (O-RAN) based VPP. FIG. 2B illustrates VPP functionality in a base station 201, 202, 203, 204 (ORAN-based or non-ORAN based). FIG. 2C illustrates VPP functionality in SMO or NMS 220 (ORAN-based or non-ORAN based).

In FIG. 2A, a VPP controller function, such as a VPP xAPP 212, may reside in a near-RT RIC 210. The VPP controller function is a function that collects electricity-related information and makes power consumption related decisions, such as FFR.

ESM 211, 222, 224 and other data traffic or power consumption related functions may reside in the near-RT RIC 210, SMO or NMS 220, in base stations 201, 202, 203, 204 or a combination of locations (in case of hybrid ESM). The ESM xAPP(s) 211, ESM app(s) 222, and ESM logic 224 aim at the same outcome, i.e., controlling radio resources to minimize energy consumption. However, the available input data, its granularity and frequency may be different in these different alternatives. Furthermore, the scope (area or number of base stations) may be different for different approaches.

In alternative implementations, the VPP controller function 212, 223 may be located in the service management and orchestration (SMO) or NMS 220, or in a base station 201, 202, 203, 204.

When both the VPP controller 212, 223 and the ESM 211, 222, 224 are located in the same element (e.g., ESM xAPP 211 and VPP xAPP 212 in the near-RT RIC 210 in FIG. 2A, or ESM application 222 and VPP application 223 in the NMS 220 in FIG. 2C), the signaling is between the ESM application 222 and VPP controller application 223, or between the ESM xAPP 211 and VPP xAPP 212.

As shown in FIG. 2B, when the VPP controller application 223 resides in a base station 201, 202, 203, 204, and the ESM 222 resides in the NMS 220 (or vice versa), the signaling between the VPP controller application 223 and the ESM 222 may take place through the southbound interface of the NMS 220.

When the VPP controller 212 resides in the near-RT RIC 210, and the ESM 222 resides in the SMO 220 (or vice versa), the signaling between the VPP controller 212 and the ESM 222 may take place, for example, over an O1 or A1 interface.

When the VPP controller 212 resides in the near-RT RIC 210, and the ESM 224 resides in a base station 201, 202, 203, 204 (or vice versa), the signaling between the VPP controller 212 and the ESM 224 may take place, for example, over an E2 interface.

A given base station 201, 202, 203, 204 may have its own internal means, for example the ESM logic 224, to control power consumption. It is also possible to have another element, such as the near-RT RIC 210, to collect data from multiple base stations 201, 202, 203, 204 and act as a middleman. The base stations 201, 202, 203, 204 may correspond to the access node 104 of FIG. 1.

The near-RT RIC platform 210 defined by O-RAN offers a range of services to applications, called xApps 211, 212, wherein a given xAPP may control some RAN function(s) or RAN site function(s) or a part of it. xApps can also exchange information between them, enabling to build sophisticated use cases leveraging the capabilities of multiple xApps.

Additionally, O-RAN has defined a network management entity called service management and orchestration (SMO) 220, within which another control function called a non-real-time RIC 221 resides. The SMO 220 may be connected to the RAN network functions, including the near-RT RIC 210, via an O1 interface which is an FCAPS interface. The non-real-time RIC 221 may be used to control the near-RT RIC 210. The non-RT RIC 221 may be connected to the near-RT RIC 210 via an A1 interface, which is a declarative policy interface, for conveying service level policies guiding the near-RT RIC 210.

The near real-time RIC 210 may be used for controlling RAN functions (e.g., radio admission control, UE inactivity handling, handover control, beam management, etc.) and RAN site functions (e.g., cell site auxiliary equipment). This control utilizes the E2 interface between the near-RT RIC 210 and the entities 200, 201, 202, 203, 204 executing the RAN functions or RAN site functions. The entities 201, 202, 203, 204 executing the RAN functions may include, for example, DU, CU-CP, CU-UP, gNB, eNB, and/or small cells (SC).

One or more RAN site functions 200 (e.g., cell site auxiliary functions) may be included in the O-RAN architecture by extending the E2 interface to also support RAN site functions, thereby enabling to build one or more xApps that control those RAN site functions and further enabling the non-RT RIC 221 to define A1 policies for guiding these xApps. These xApps may also be subject to integration to the SMO 220 via the O1 interface, like any other xApps used for controlling RAN functions.

The one or more RAN site functions 200 and the entities 201, 202, 203, 204 may be called E2 nodes. There may be a single generic E2 node type covering all the various RAN site functions (e.g., E2 node type: RAN site function), or there may be separate E2 node types for each specific RAN site function (e.g., E2 node type: power supply system, E2 node type: temperature control system, etc.).

An E2 node 200, 201, 202, 203, 204 may be defined as a logical node terminating the E2 interface interfacing with the near-RT RIC 210. A RAN function or a RAN site function may be defined as a specific function in an E2 node.

Herein the term "RAN site function" may refer to cell site auxiliary equipment, such as a power supply system, a temperature control system, an air conditioning system, a liquid cooling system, transport network equipment, a motion detector, a camera, a drone charging station, a radar, a lidar, a positioning device, a diesel power generator, a solar panel, jamming or anti-jamming equipment, a door sensor, an earthquake sensor, an air pollution sensor, a wind meter, a temperature sensor, a humidity sensor, a leakage indicator, a corrosion sensor, an actuator, an intrusion alarm system, or a fire alarm system. There may be an N: M mapping between RAN site functions and cell site auxiliary equipment, such that one cell site auxiliary equipment may comprise one or more RAN site functions, or vice versa.

Figure 3:
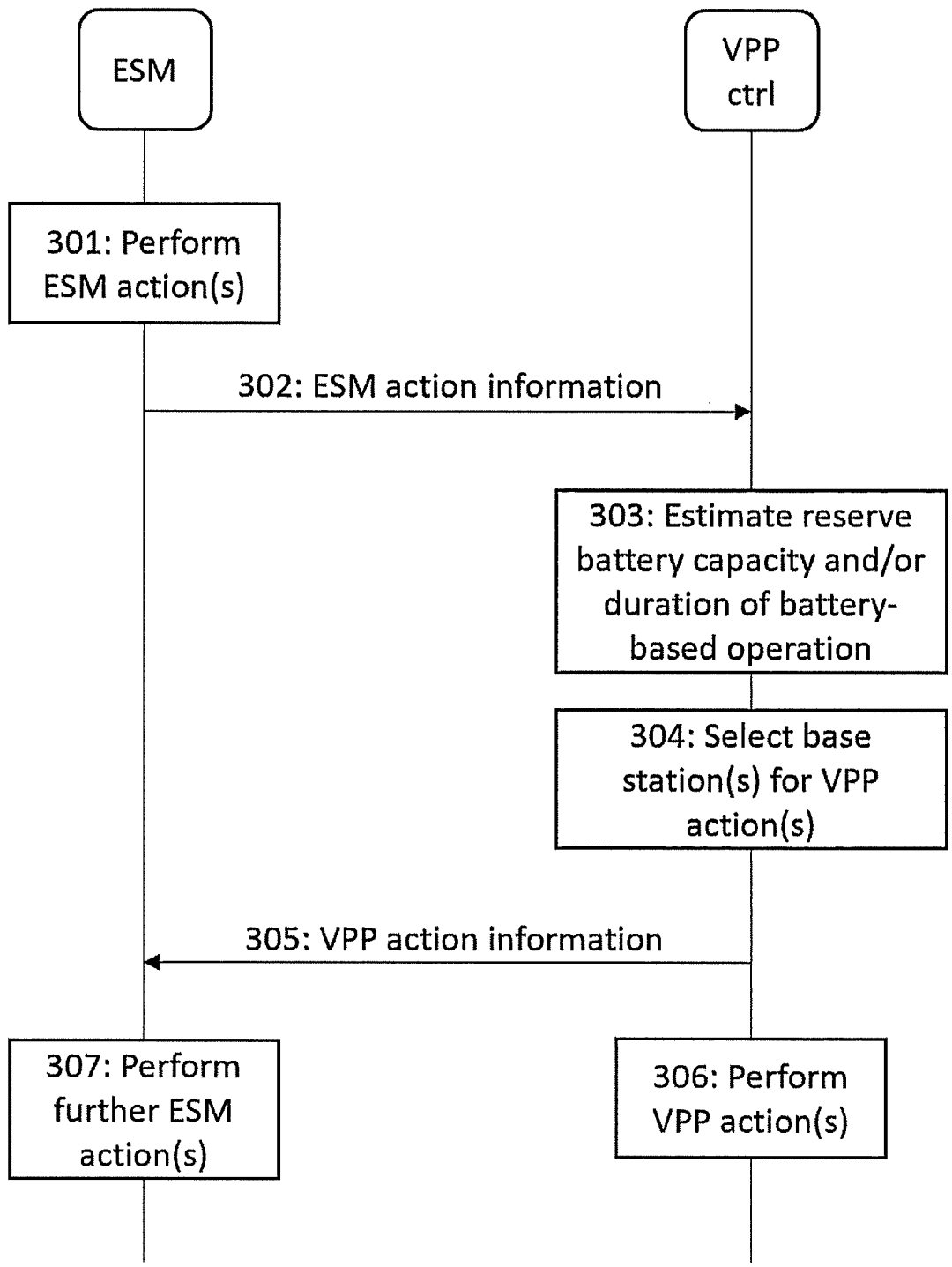
FIG. 3 illustrates a signaling diagram.

FIG. 3 illustrates a signaling diagram according to an example embodiment for interoperability between ESM and VPP to avoid incorrect VPP decisions due to ESM actions and/or vice versa. This may also enable combined or joint ESM and VPP or peak shaving optimization.

The ESM of FIG. 3 may correspond to the ESM application 222, ESM xAPP 211, or ESM logic 224 described above. The VPP controller (VPP ctrl) of FIG. 3 may correspond to the VPP xAPP 212 or VPP application 223 described above.

Referring to FIG. 3, at 301, the ESM performs one or more ESM actions causing a change in at least one of: a traffic profile of one or more base stations, or a power consumption profile of the one or more base stations.

For example, the one or more ESM actions may comprise at least one of: switching one or more radio layers of the one or more base stations on or off, switching one or more cells or cell layers of the one or more base stations on or off, switching one or more small cells or a Home eNodeB (HeNB) of the one or more base stations on or off, switching a radio technology of the one or more base stations on or off, muting or activating one or more transmitter paths or beams of the one or more base stations, muting or activating one or more receiver paths or beams of the one or more base stations, switching one or more computing nodes of the one or more base stations on or off, adjusting transmission power of the one or more base stations, increasing or decreasing a clock frequency of the one or more computing nodes of the one or more base stations, controlling an idle state behaviour (e.g., Intel c-state control) of one or more processors of the one or more base stations, and/or controlling one or more radio network performance values with respect to energy saving.

At 302, the ESM transmits, to the VPP controller, ESM action information indicating the one or more ESM actions. The ESM action information indicates the one or more ESM actions causing the change in the at least one of: the traffic profile of the one or more base stations, or the power consumption profile of the one or more base stations.

The ESM action information may be real-time information, near-real-time information, or non-real-time information. The real-timeness depends on where the one or more ESM actions are performed. If the one or more ESM actions are performed at the cell site (base station), then the ESM action information may be real-time information. If the one or more ESM actions are performed in RIC, then the ESM action information may be near-real-time information. If the one or more ESM actions are performed in SMO or NMS, then the ESM action information may be non-real-time-information.

As any actions taken by the ESM may change the power consumption estimates of a given base station, information on the actions that the ESM takes should be signaled to the VPP controller. Doing so may help to avoid events, where the VPP controller selects wrong base stations for VPP or peak shaving due to incorrect traffic profiles or power consumption profiles due to changes caused by the ESM.

In order to make the VPP controller aware of the ESM's decisions and their impact to VPP reserve capacity, the ESM action information transmitted from the ESM to the VPP controller may comprise (but is not limited to) at least one of: an action type of the one or more ESM actions (i.e., what kind of ESM action was performed), an estimated amount of energy or power saved due to the one or more ESM actions, a time of the one or more ESM actions, a duration of the one or more ESM actions, and/or a reason for performing the one or more ESM actions.

At 303, the VPP controller estimates an amount of reserve battery capacity and/or a duration of battery-based operation of the one or more base stations based at least partly on the change caused to the at least one of: the traffic profile of the one or more base stations, or the power consumption profile of the one or more base stations. The VPP controller may decide and/or schedule one or more VPP actions or peak shaving actions based at least partly on the estimation.

At 304, the VPP controller selects, based at least partly on the received ESM action information, at least one base station from the one or more base stations for the one or more VPP actions or peak shaving actions.

At 305, the VPP controller transmits, to the ESM, VPP action information indicating the one or more VPP actions or peak shaving actions that the VPP controller intends to perform for the at least one base station.

The ESM should also know the decisions made by the VPP controller, so that trade-offs between the ESM and VPP controller decisions can be made. The ESM may make decisions based on inputs from the VPP controller. In other words, the ESM may perform one or more further ESM actions during the one or more VPP actions or peak shaving actions based on the VPP action information.

The VPP action information transmitted from the VPP controller to the ESM may comprise (but is not limited to) at least one of: an action type of the one or more virtual power plant actions or peak shaving actions (i.e., what kind of action is performed or will be performed), estimation of peak shaving utilization time, a duration of the one or more virtual power plant actions, a start time of the one or more virtual power plant actions, a stop time of the one or more virtual power plant actions, and/or a reason for performing the one or more virtual power plant actions or peak shaving actions. The peak shaving utilization time refers to the time when the one or more peak shaving actions are active.

For example, the VPP action information may comprise real-time information (e.g., base station operation with batteries or power grid), future projection of peak shaving schedule, and/or future projection of potential VPP activation time, such as in VPP state (bid won); not in VPP state (bid lost or not bidding); or undefined (bid result not yet known).

At 306, the VPP controller initiates or performs the one or more VPP actions or peak shaving actions associated with at least one base station of the one or more base stations. The VPP action information may be transmitted before or during the one or more VPP actions or peak shaving actions (e.g., in real time as the actions are performed).

The one or more virtual power plant actions or peak shaving actions may comprise at least one of: charging one or more batteries of the at least one base station from a power grid, discharging energy from the one or more batteries to the power grid, operating the at least one base station on battery power, operating the at least one base station on power provided by the power grid, or reducing power consumption of the at least one base station.

At 307, the ESM may perform one or more further ESM actions during or after the one or more VPP actions or peak shaving actions based at least partly on the VPP action information.

For example, battery duration of the at least one base station may be optimized during the one or more VPP actions (e.g., FCR) or peak shaving actions by reducing power consumption with the ESM instead of or together with operating the at least one base station on battery power.

As another example, the ESM may be used to ensure that regulatory requirements are met when recharging the one or more batteries of the at least one base station after the one or more VPP actions or peak shaving actions have been performed. Use of ESM during the recharging may enable to use more battery capacity than without ESM, as otherwise the regulatory requirement may not be met.

Thus, the signaling between the VPP controller and ESM may help to avoid conflicts and optimize energy saving.

Signaling information from or to the ESM to or from the VPP controller enables joint ESM and VPP decision-making with mutual understanding. FIG. 3 shows distributed decision-making, where the ESM and VPP decisions are made separately based on the signaling. Another alternative is to signal the same information to a separate decision-making entity (coordinator) that controls the decisions for both the ESM and VPP, as shown in FIG. 4.

Figure 4:
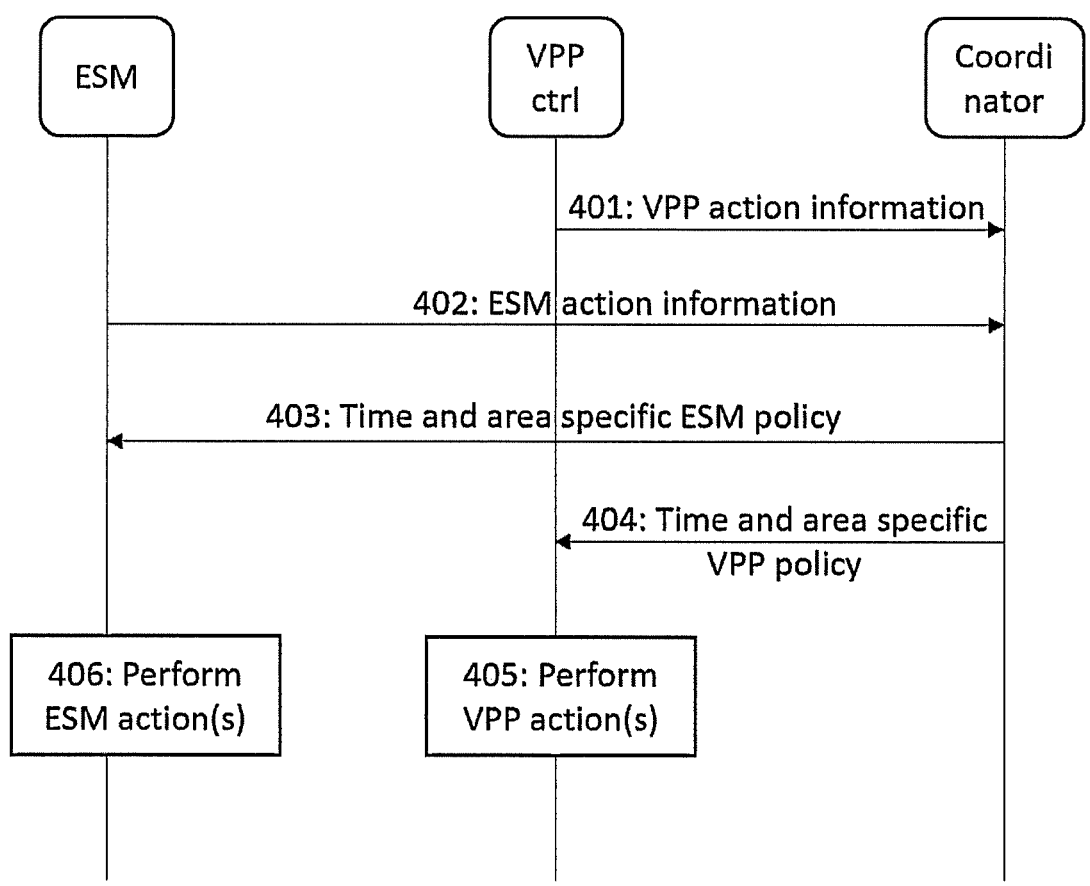
FIG. 4 illustrates a signaling diagram.

FIG. 4 illustrates a signaling diagram according to an example embodiment for decision-making for trade-off between ESM and VPP. In this example embodiment, a separate decision-making entity called a coordinator controls the ESM and VPP controller.

The ESM of FIG. 4 may correspond to the ESM application 222, ESM xAPP 211, or ESM logic 224 described above. The VPP controller (VPP ctrl) of FIG. 4 may correspond to the VPP xAPP 212 or VPP application 223 described above.

The coordinator of FIG. 4 may be a separate entity, such as an xApp or other application in the SMO 220), or the coordinator role may be assigned to the ESM or the VPP controller.

Referring to FIG. 4, at 401, the VPP controller transmits VPP action information to the coordinator. The contents of the VPP action information may be the same as described above with reference to FIG. 3.

At 402, the ESM transmits ESM action information to the coordinator. The contents of the ESM action information may be the same as described above with reference to FIG. 3.

At 403, based on the VPP action information and the ESM action information, the coordinator generates a time and area specific ESM policy and transmits it to the ESM.

The ESM policy from the coordinator may comprise, for example, selection of certain base stations for one or more ESM actions, time for the one or more ESM actions (e.g., start time, stop time, and/or duration), and/or aggressiveness of the one or more ESM actions (e.g., how much the ESM should reduce energy consumption with a specific load).

In addition, the decision from the coordinator may comprise turning the ESM on or off.

At 404, based on the VPP action information and the ESM action information, the coordinator generates a time and area specific VPP policy and transmits it to the VPP controller.

The VPP policy from the coordinator may comprise, for example, selection of certain base stations for one or more VPP actions or peak shaving actions, time for the one or more VPP actions or peak shaving actions (e.g., start time, stop time, and/or duration), and/or aggressiveness of the one or more VPP actions or peak shaving actions.

In addition, the decision from the coordinator may comprise turning the VPP or peak shaving on or off. For example, the decision may indicate to turn on or off peak shaving by reducing power consumption of a given base station, or by operating a given base station on battery power. In other words, the coordinator may initiate the one or more VPP actions or peak shaving actions.

At 405, the VPP controller performs the one or more VPP actions or peak shaving actions based on the VPP policy and/or decision from the coordinator. Some examples of the VPP actions or peak shaving actions are described above with reference to FIG. 3.

At 406, the ESM performs the one or more ESM actions during or after the one or more VPP actions or peak shaving actions based on the ESM policy and/or decision from the coordinator. Some examples of the ESM actions are described above with reference to FIG. 3.

Figure 5:
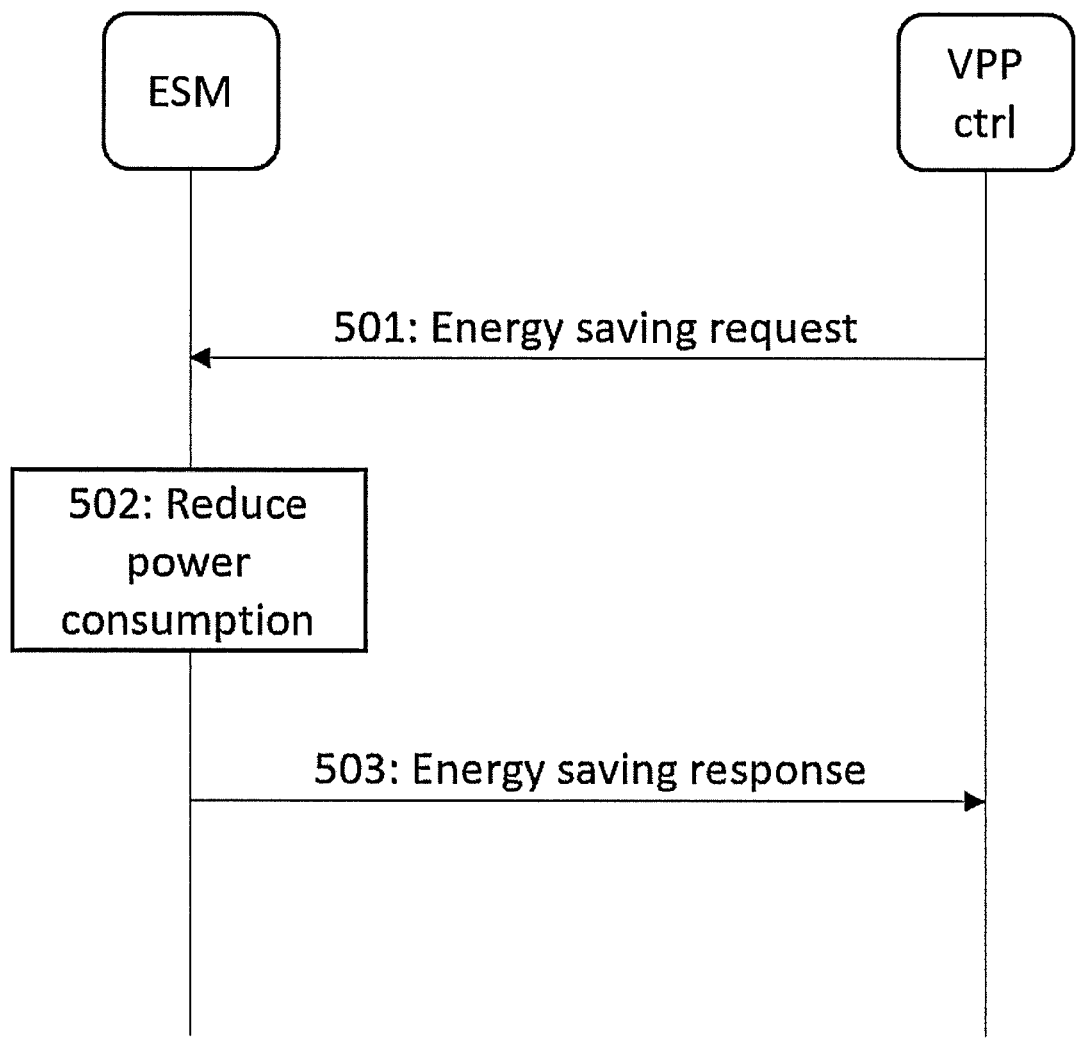
FIG. 5 illustrates a signaling diagram.

FIG. 5 illustrates a signaling diagram according to an example embodiment for optimizing battery consumption with ESM for example during peak shaving or FCR.

The ESM of FIG. 5 may correspond to the ESM application 222, ESM xAPP 211, or ESM logic 224 described above. The VPP controller (VPP ctrl) of FIG. 5 may correspond to the VPP xAPP 212 or VPP application 223 described above.

The functions illustrated in FIG. 5 may be performed in addition to or as an alternative to the functions of FIG. 3 or FIG. 4.

When FCR or peak shaving is done, the base station may be operated with battery power over a relatively long period (e.g., 30 to 60 minutes). The time how long the batteries can be used to operate the base station depends on the power consumption of the base station and regulatory requirements. The duration of using the batteries should be such that the remaining battery capacity with forecasted data traffic would meet the regulatory requirements. By optimizing data traffic with ESM, power consumption and therefore the duration of battery use may be optimized. In addition, ESM-based data traffic optimization may be used to minimize battery consumption, so that the regulatory requirements can be met with lower charge level, and therefore a longer time can be spent with FCR or peak shaving.

The regulator may demand the batteries to be recharged within a given time limit during active operation of the base station (e.g., 80% charge level within 24 hours is a Traficom requirement in Finland). In order to meet this requirement, the base station's power consumption may be reduced with ESM. Further, use of ESM during the recharging may enable to use more battery capacity than without ESM, as otherwise the regulatory requirement may not be met.

Referring to FIG. 5, at 501, the VPP controller (or some other suitable element) transmits an energy saving request to the ESM for reducing power consumption of at least one base station during or after one or more virtual power plant actions or peak shaving actions associated with the at least one base station. The energy saving request may indicate at least one of: an amount of energy requested to be saved, a priority or criticality of the request, a time for the requested energy saving, and/or activation or deactivation of the ESM.

At 502, if the ESM accepts the received energy saving request, the ESM reduces the power consumption of the at least one base station during or after the one or more virtual power plant actions or peak shaving actions.

At 503, the ESM may transmit an energy saving response to the VPP controller in response to the energy saving request. The energy saving response may indicate a positive acknowledgement (i.e., an acceptance) or a negative acknowledgement (i.e., a rejection) to the energy saving request.

The signaling of FIG. 5 may also apply to the case, in which the VPP action is to reduce power consumption with ESM instead of or together with operating the at least one base station on battery power.

Figure 6:
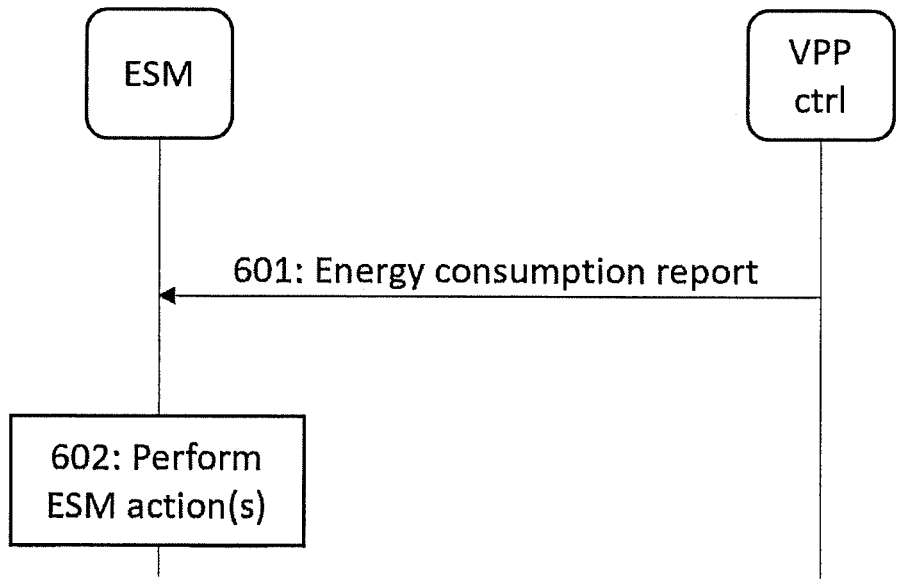
FIG. 6 illustrates a signaling diagram.

FIG. 6 illustrates a signaling diagram according to an example embodiment for energy saving based on total energy consumption per base station.

The ESM of FIG. 6 may correspond to the ESM application 222, ESM xAPP 211, or ESM logic 224 described above. The VPP controller (VPP ctrl) of FIG. 6 may correspond to the VPP xAPP 212 or VPP application 223 described above.

The functions illustrated in FIG. 6 may be performed in addition to or as an alternative to the functions of FIG. 3 or FIG. 4.

In order to make energy saving more accurate, instead of relying only on estimates for data traffic or number of users, it may be beneficial to provide the ESM with information about the total energy consumption in one or more base stations. The energy consumption information may be collected by the VPP controller (or other element) and signalled to ESM, as shown in FIG. 6.

Referring to FIG. 6, at 601, the VPP controller (or other element) transmits an energy consumption report to the ESM, wherein the energy consumption report indicates an amount of energy consumed by one or more base stations.

For example, the energy consumption report may indicate the energy consumption as a function of time, per base station, and/or per area. The energy consumption report may also indicate a configuration of a power system of a given base station, such as battery size, state-of-charge, charge profile and/or discharge profile, etc. The energy consumption report may also include information about the amount of throughput that can be transmitted or achieved with a certain performance level. The energy consumption may be expressed, for example, in kilowatt hours (kWh) or any other suitable unit. The energy consumption may be relative to a known reference, such as battery capacity.

At 602, the ESM may perform one or more energy saving management actions based at least partly on the amount of energy consumed by the one or more base stations. Some examples of the energy saving management actions are described above with reference to FIG. 3.

Figure 7:
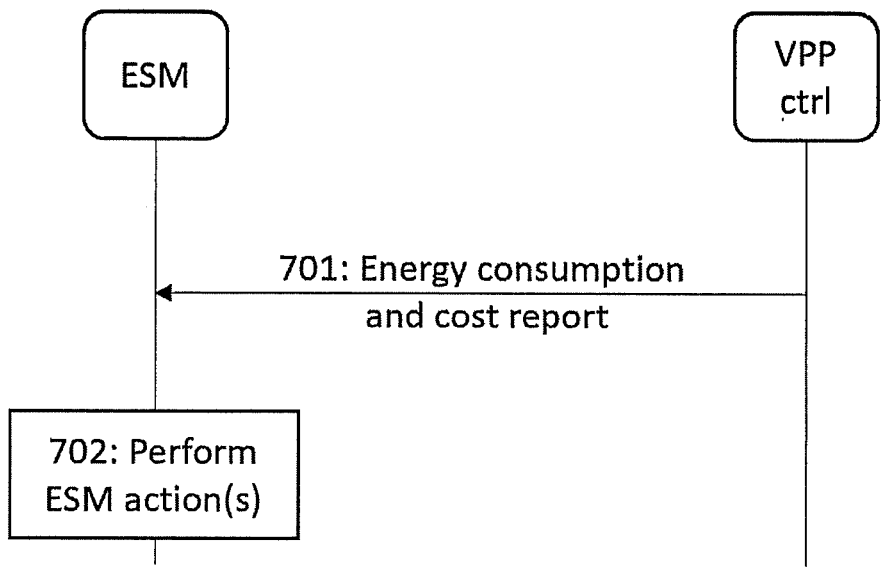
FIG. 7 illustrates a signaling diagram.

FIG. 7 illustrates a signaling diagram according to an example embodiment for energy saving based on total cost based on power consumption and electricity price information. Energy saving based on the total energy cost may be enabled by signaling power consumption and energy price information from the VPP controller (or other element(s) where the information is available) to the ESM, as shown in FIG. 7.

The ESM of FIG. 7 may correspond to the ESM application 222, ESM xAPP 211, or ESM logic 224 described above. The VPP controller (VPP ctrl) of FIG. 7 may correspond to the VPP xAPP 212 or VPP application 223 described above.

The functions illustrated in FIG. 7 may be performed in addition to or as an alternative to the functions of FIG. 3 or FIG. 4.

Referring to FIG. 7, at 701, the VPP controller (or other element) transmits an energy consumption and cost report to the ESM, wherein the energy consumption and cost report comprises energy consumption information of one or more base stations, as well as electricity price information indicating a price of energy as a function of time. The energy consumption may be indicated as described above with reference to FIG. 6.

The electricity price information may comprise, for example, at least one of: electricity spot price as a function of time, transmission price, price marginal, quota, or any combination of these. The price of energy may be expressed, for example, in euros or dollars or any other currency. The price of energy may be relative to a known reference.

At 702, the ESM may perform one or more energy saving management actions based at least partly on the price of energy and the amount of energy consumed by the one or more base stations.

The price of energy may indicate an imbalance in the power grid. For example, when the price of energy is high (e.g., above a threshold), this may indicate that energy demand exceeds the available power production in the power grid, and thus the power consumption of the one or more base stations may be reduced in order to support the stability of the power grid. On the other hand, when the price of energy is low (e.g., below a threshold), this may indicate that the power production exceeds the energy demand in the power grid, and thus the power consumption of the one or more base stations may be increased in order to support the stability of the power grid.

Figure 8:
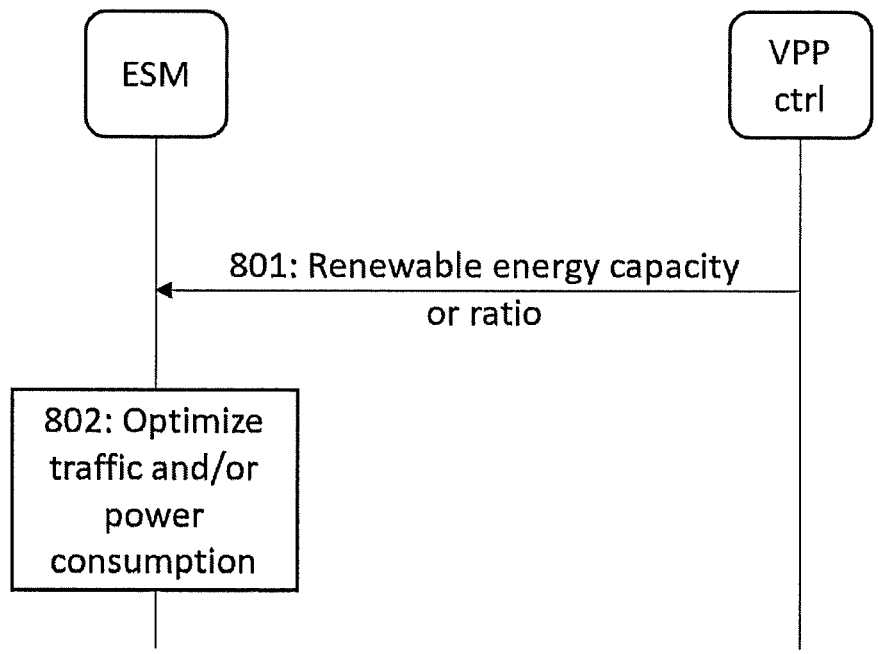
FIG. 8 illustrates a signaling diagram.

FIG. 8 illustrates a signaling diagram according to an example embodiment for optimizing data traffic and power consumption with ESM to match with available renewable energy capacity.

The ESM of FIG. 8 may correspond to the ESM application 222, ESM xAPP 211, or ESM logic 224 described above. The VPP controller (VPP ctrl) of FIG. 8 may correspond to the VPP xAPP 212 or VPP application 223 described above.

The functions illustrated in FIG. 8 may be performed in addition to or as an alternative to the functions of FIG. 3 or FIG. 4.

In legacy systems, when energy saving is done, the available renewable energy capacity (e.g., solar panels) at the cell site is not taken into account in energy saving decisions. By using ESM, data traffic and power consumption can be optimized to match with the available or predicted renewable energy capacity, such as solar panels at the cell site, so that the cell site (base station) may be operated fully with renewable capacity, or the ratio of renewable energy over the total consumption may be optimized. The optimization point may be decided based on different metrics, such as carbon dioxide impact, electricity price, etc.

Electricity price information may also be signaled from the VPP controller to the ESM, as described above with reference to FIG. 7. The available renewable (or locally produced) energy may be informed to the ESM by the VPP controller (or other element having such information), as shown in FIG. 8.

Referring to FIG. 8, at 801, the VPP controller (or other element) transmits, to the ESM, information indicating an amount of renewable energy capacity available for operating one or more base stations. The amount of renewable energy capacity may be indicated as an absolute value (e.g., in kWh or other suitable unit) or as a ratio of total available energy at the cell site. The information may further comprise a forecast of renewable energy capacity predicted to be available at a future point in time, for example based on weather forecast information or other sources.

At 802, the energy saving management application optimizes data traffic and/or power consumption of the one or more base stations based at least partly on the amount of renewable energy capacity.

Figure 9:
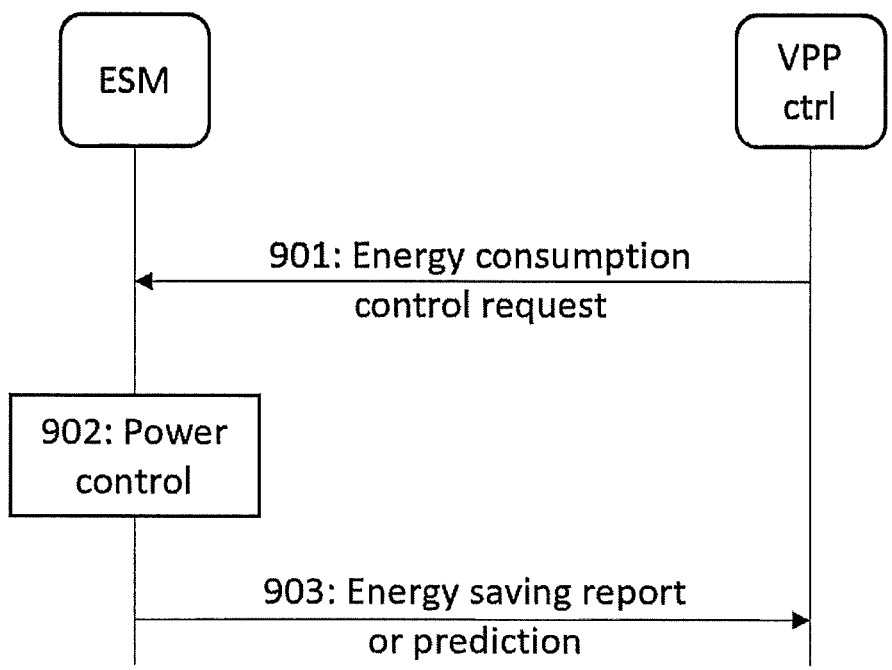
FIG. 9 illustrates a signaling diagram.

FIG. 9 illustrates a signaling diagram according to an example embodiment, wherein variation of base station power consumption may be minimized by ESM in real time (e.g., with power control or activation or deactivation of transmitter and/or receiver paths for VPP purposes).

The ESM of FIG. 9 may correspond to the ESM application 222, ESM xAPP 211, or ESM logic 224 described above. The VPP controller (VPP ctrl) of FIG. 9 may correspond to the VPP xAPP 212 or VPP application 223 described above.

The functions illustrated in FIG. 9 may be performed in addition to or as an alternative to the functions of FIG. 3 or FIG. 4.

For VPP purposes, as stable power consumption as possible would be beneficial. For example, for an hour during which reserve capacity has been sold, the power consumption should be continuously as close as possible to the bidded reserve capacity.

Referring to FIG. 9, at 901, a VPP controller (or other element) transmits, to the ESM, an energy consumption control request. The energy consumption control request may comprise (but is not limited to) at least one of: a target value or one or more limits (e.g., an upper and lower limit) for power consumption (e.g., in kW) or energy consumption (e.g., in J or kWh) of at least one base station, one or more exceptions, and/or hysteresis. In other words, the energy consumption control request may indicate variance reduction or power consumption limits.

One example of an exception may be that the VPP controller has provided the one or more limits for power consumption or energy consumption, but the one or more limits become obsolete in a given situation or time, for example due to an abnormal traffic peak (i.e., exception).

The hysteresis may be a time or value. For example, the ESM may make decisions based on the target value added by the hysteresis. The hysteresis may help to make the system more stable.

The VPP controller may also define one or more rules in the energy consumption control request. As an example, the one or more rules may indicate to increase communication delay, if it allows to save a certain amount of energy (e.g., average round trip time may be added by 1 ms, if it allows to save 5% energy).

At 902, based on the target value or the one or more limits (and/or the one or more rules), the ESM may control the power consumption of the at least one base station for example during one or more virtual power plant actions or peak shaving actions. For example, the ESM may perform power control of the at least one base station, and/or activate or deactivate one or more transmitter paths and/or one or more receiver paths of the at least one base station. This way, the ESM may control the power consumption of the at least one base station in order to reach the target value or to keep the power consumption within the one or more limits.

At 903, the ESM may transmit a response to the VPP controller (or other element) in response to the energy consumption control request. The response may comprise (but is not limited to) at least one of: a positive or negative acknowledgement to the energy consumption control request, one or more alarms in case of violation of the one or more limits, and/or an energy saving report. The energy saving report may indicate a measured or predicted amount of energy saving due to the action(s) performed at 902.

Figure 10:
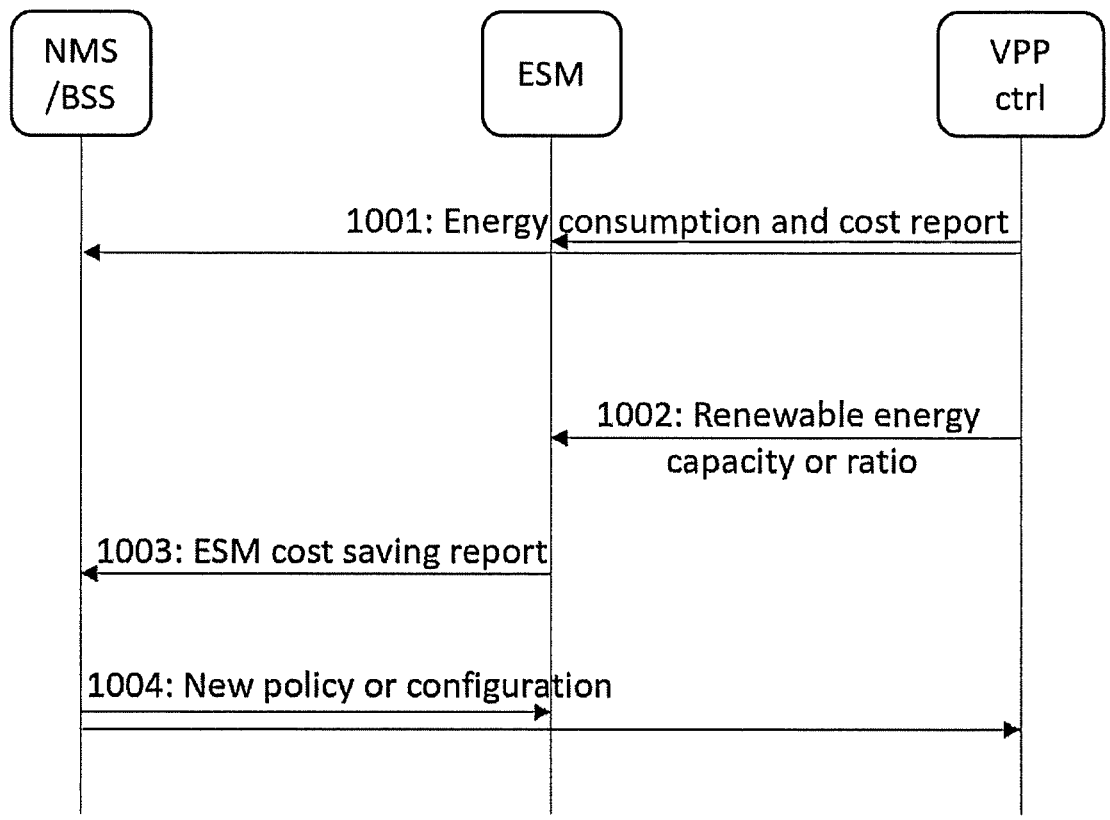
FIG. 10 illustrates a signaling diagram.

FIG. 10 illustrates a signaling diagram according to an example embodiment for cost saving reporting based on energy saving functionality, calculated from energy price per base station or a part of a base station (e.g., sector, radio unit, baseband, cell) or area.

The ESM of FIG. 10 may correspond to the ESM application 222, ESM xAPP 211, or ESM logic 224 described above. The VPP controller (VPP ctrl) of FIG. 10 may correspond to the VPP xAPP 212 or VPP application 223 described above.

The functions illustrated in FIG. 10 may be performed in addition to or as an alternative to the functions of FIG. 3 or FIG. 4.

In the above, signaling of energy consumption and cost report and amount of available renewable energy capacity has been described. Based on these and the ESM estimate for reduced data traffic in the network, the ESM is able to make an estimate of cost savings due to energy saving. Cost savings can be reported to one or more reporting systems, such as NMS or business support system (BSS) or similar.

Referring to FIG. 10, at 1001, the VPP controller transmits, to the ESM and/or NMS or BSS, an energy consumption and cost report. The energy consumption and cost report is described above with reference to FIG. 7.

At 1002, the VPP controller transmits, to the ESM, information comprising an amount of renewable energy capacity. The amount of renewable energy capacity may be indicated as an absolute value (e.g., in kWH or other suitable unit) or as a ratio of total available energy at the cell site. The information may further comprise a forecast of renewable energy capacity predicted to be available at a future point in time, for example based on weather forecast information or other sources.

At 1003, the ESM transmits, to one or more reporting systems such as an NMS or BSS, an ESM cost saving report. The cost savings due to ESM may be indicated, for example, as a function of time, as an absolute value (e.g., in euros, dollars, kWHs, or carbon dioxide amount), and/or relative savings. The ESM may generate the ESM cost saving report based at least on the energy consumption and cost report and/or the information indicating the amount of renewable energy capacity.

At 1004, based on the ESM cost saving report (or the cost report transmitted by the VPP controller), the NMS or BSS may automatically change new policies or configurations and transmit them to the ESM and/or VPP.

For example, the ESM may be configured to utilize a more aggressive policy for energy saving, when energy price per transmitted bit is high (with a penalty of worse end user QoS). As another example, the ESM may be configured to utilize a less aggressive policy for energy shaving, when energy price per transmitted bit is low. As another example, peak shaving may be made more aggressively at sites or areas, where energy consumption is low, since longer peak shaving periods are possible, while still fulfilling the regulatory requirements with the remaining battery capacity.

Alternatively, if the ESM cost saving report indicates crossing a pre-defined cost target level, then this may trigger automatic reporting, for example, via short message service (SMS) or email to designated operator personnel, or trigger an alarm or notification in a graphical user interface.

Figure 11:
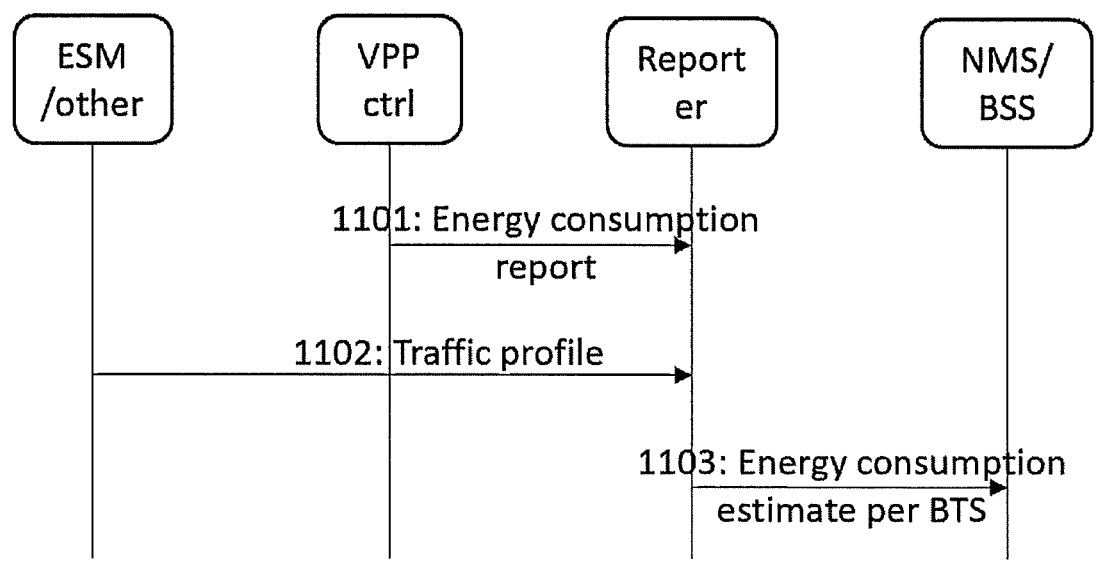
FIG. 11 illustrates a signaling diagram.

FIG. 11 illustrates a signaling diagram according to an example embodiment for detailed estimation of power consumption or energy consumption per base station estimated based on power consumption measurements from the power system and traffic profiles in the near-RT RIC.

For example, the detailed estimation of energy consumption may mean estimating energy consumption per transmitted bit. This estimation can be made by measuring the actual power consumption and number of transmitted used bits at the same time. This can be base consumption when no bits are transmitted, or incremental energy consumption per bit over the base consumption. These can be for uplink and downlink. The transmitted end user bits can be further split to a combination of user plane and control plane bits.

Thus, this example embodiment enables to provide information on how much traffic has been served with the consumed energy and what is the network performance achieved with the consumed energy per base station or a part of base station or area. Based on these and the ESM estimates for reduced data traffic in the network, it is possible to make an estimate of cost savings due to ESM. The cost savings can be reported to one or more reporting systems, such as NMS or BSS or similar.

Power consumption refers to the rate at which energy is consumed by a base station, and it may be measured, for example, in watts (W) or kilowatts (kW). Energy consumption, on the other hand, refers to the total amount of energy used over a period of time, and it may be measured, for example, in watt-hours (Wh) or kilowatt-hours (kWh) or joules (J). For example, a base station that consumes 1 kW of power for 1 hour would have an energy consumption of 1 kWh.

The ESM of FIG. 11 may correspond to the ESM application 222, ESM xAPP 211, or ESM logic 224 described above. The VPP controller (VPP ctrl) of FIG. 11 may correspond to the VPP xAPP 212 or VPP application 223 described above.

The functions illustrated in FIG. 11 may be performed in addition to or as an alternative to the functions of FIG. 3 or FIG. 4.

Referring to FIG. 11, at 1101, the VPP controller transmits an energy consumption report to a reporter function, wherein the energy consumption report comprises energy consumption information of one or more base stations. For example, the reporter function may be located in SMO 220 or NMS.

For example, the energy consumption report may indicate the energy consumption as a function of time, per base station, and/or per area. The energy consumption report may also indicate a configuration of a power system of a given base station, such as battery size, state-of-charge, charge profile and/or discharge profile, etc. The energy consumption may expressed, for example, in kilowatt hours (kWh) or any other suitable unit. The energy consumption may be relative to a known reference, such as battery capacity.

The energy consumption report may also indicate energy cost as a function of time.

At 1102, the ESM (or other element) transmits, to the reporter, a message comprising at least a traffic profile of the one or more base stations. The message may further comprise an energy savings estimate of the one or more base stations, and/or information indicating one or more actions taken by the ESM.

At 1103, based on the energy consumption report and the traffic profile(s), the reporter transmits, to one or more reporting systems such as an NMS or BSS, an energy consumption report comprising (but not limited to) at least one of: cost savings due to ESM per base station or area, energy savings (e.g., in kWH or as a relative amount) due to ESM per base station or area, amount of served data traffic with the consumed energy (e.g., bit/kWH, or bit/€). The report is based on the information provided by the VPP controller and the ESM at 1101 and 1102.

Figure 12:
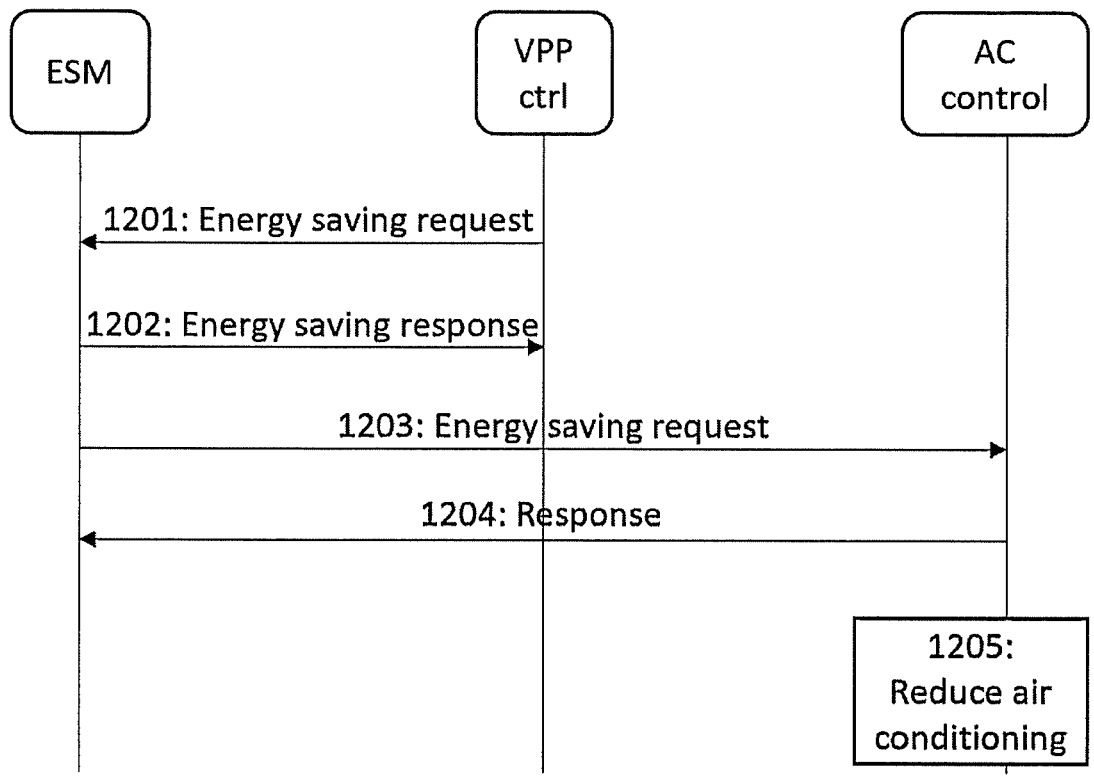
FIG. 12 illustrates a signaling diagram.
Figure 13:
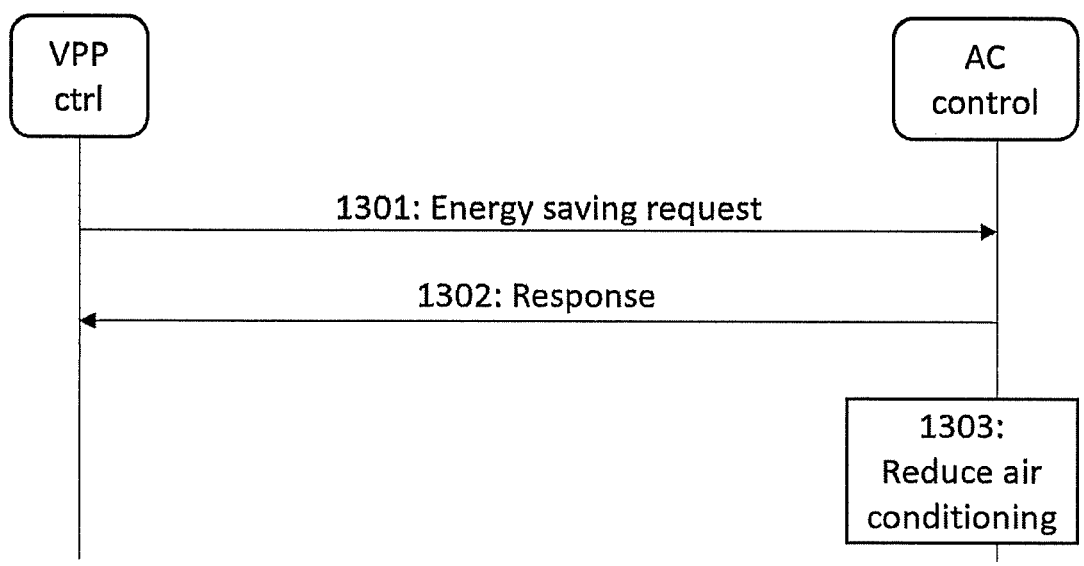
FIG. 13 illustrates a signaling diagram.

FIG. 12 and FIG. 13 illustrate signaling diagrams according to example embodiments for controlling air conditioning activity and/or thresholds during VPP action and/or ESM. Reducing air conditioning activity at the cell site (base station) may reduce energy consumption to save energy and to increase VPP reserve capacity during VPP or peak shaving action(s). This can be done either by directly commanding the air conditioning control system or by setting thresholds during VPP action and/or ESM.

The ESM of FIG. 12 and FIG. 13 may correspond to the ESM application 222, ESM xAPP 211, or ESM logic 224 described above. The VPP controller (VPP ctrl) of FIG. 12 and FIG. 13 may correspond to the VPP xAPP 212 or VPP application 223 described above.

The functions illustrated in FIG. 12 or FIG. 13 may be performed in addition to or as an alternative to the functions of FIG. 3 or FIG. 4.

FIG. 12 illustrates an option, where the VPP controller communicates with the air conditioning control system via the ESM.

Referring to FIG. 12, at 1201, the VPP controller transmits an energy saving request to the ESM. The energy saving request may indicate at least one of: an amount of energy requested to be saved, a priority or criticality of the request, a time for the requested energy saving, and/or activation or deactivation of the ESM.

At 1202, the ESM transmits an energy saving response to the VPP controller in response to the energy saving request. The energy saving response may indicate a positive or negative acknowledgement to the energy saving request received by the ESM.

At 1203, based on the energy saving request received from the VPP controller, the ESM transmits an energy saving request to an air conditioning (AC) control system of at least one base station for reducing power consumption of the air conditioning at the at least one base station for example during one or more virtual power plant actions or peak shaving actions. The energy saving request transmitted from the ESM to the air conditioning control system may indicate at least one of: the amount of energy requested to be saved, and/or the time for the requested energy saving.

At 1204, the air conditioning control system transmits a response to the ESM in response to the energy saving request. The response may indicate a positive or negative acknowledgement to the energy saving request received by the air conditioning controller.

At 1205, if the air conditioning control system accepts the received energy saving request, the air conditioning control system reduces power consumption of the air conditioning in order to save energy.

FIG. 13 illustrates another option, where the VPP communicates directly with the air conditioning control system.

Referring to FIG. 13, at 1301, the VPP controller transmits an energy saving request to an air conditioning control system of at least one base station for reducing power consumption of air conditioning at the at least one base station for example during one or more virtual power plant actions or peak shaving actions. The energy saving request may indicate at least one of: an amount of energy requested to be saved, a priority or criticality of the request, a time for the requested energy saving, and/or activation or deactivation of the energy saving.

At 1302, the air conditioning control system transmits a response to the VPP controller in response to the energy saving request. The response may indicate a positive or negative acknowledgement to the energy saving request received by the air conditioning controller.

At 1303, if the air conditioning control system accepts the received energy saving request, the air conditioning control system reduces power consumption of the air conditioning in order to save energy.

Figure 14:
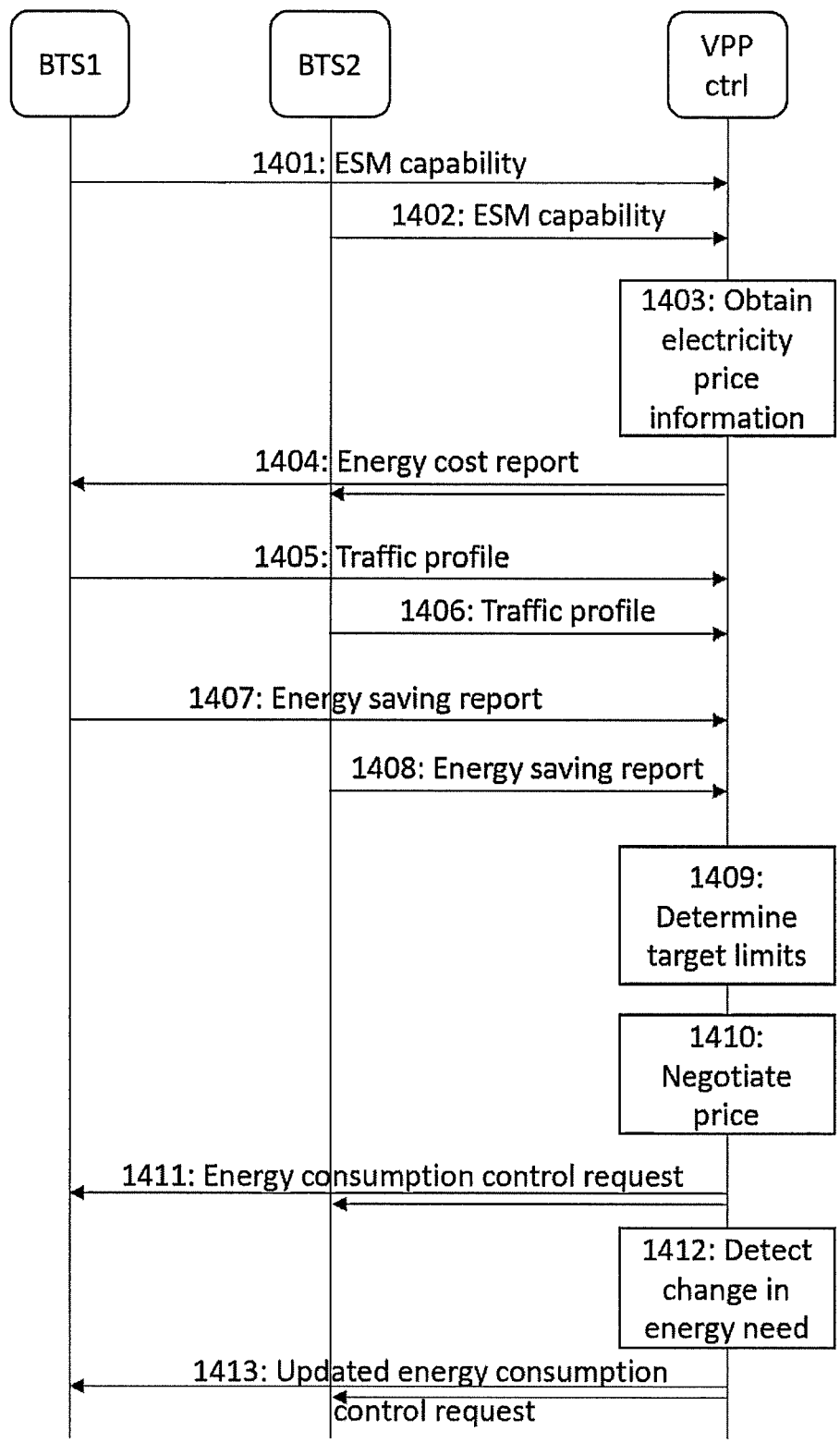
FIG. 14 illustrates a signaling diagram.

FIG. 14 illustrates a signaling diagram according to an example embodiment. Although two base stations (BTS1 and BTS2) are shown in FIG. 14, it should be noted that the number of base stations may also be different than two. In other words, there may be one or more base stations 201, 202, 203, 204. In addition, the signaling procedure illustrated in FIG. 14 may be extended and applied according to the actual number of base stations. The functions illustrated in FIG. 14 may be performed in addition to or as an alternative to the functions of FIG. 3 or FIG. 4.

This example embodiment may allow to negotiate a certain price for energy and to enforce certain energy consumption or power consumption limits to be used at the base stations. This example embodiment also enables to change the energy consumption or power consumption limits based on energy cost on network level and break the energy consumption to base station level.

A given base station may have its own internal means, such as an ESM application 224, to control energy usage. It is also possible to have an additional element such as near-RT RIC to collect data from multiple base stations and act as a middleman. A given base station may be configured with one or more rules or limits such that the base station will not cause sudden variations to power consumption of the base station (e.g., at millisecond level).

Referring to FIG. 14, at 1401, a first base station (BTS1) indicates its ESM capability to the VPP controller. The VPP controller receives the indication.

At 1402, a second base station (BTS2) indicates its ESM capability to the VPP controller. The VPP controller receives the indication.

Herein the ESM capabilities may refer to the ESM logic 224 in a given base station 201, 202, 203, 204 shown in FIG. 2A, FIG. 2B or FIG. 2C. The VPP controller may refer to the VPP xAPP 212 or VPP application 223 shown in FIG. 2A, FIG. 2B or FIG. 2C.

At 1403, the VPP controller obtains electricity price information for example from an electricity market or the internet.

At 1404, based on the electricity price information, the VPP controller may transmit an energy cost report to the first base station and the second base station. The energy cost report may indicate price of energy as a function of time.

The ESM at the first base station and the second base station may use the energy cost report as input information for energy saving at the first base station and the second base station. For example, the ESM at the first base station may attempt to save energy by reducing energy consumption of the first base station, when the energy cost is high (e.g., above a threshold). Similarly, the ESM at the second base station may attempt to save energy by reducing energy consumption of the first base station, when the energy cost is high (e.g., above the threshold).

As another example, the ESM may decide to give more energy to one of the base stations to enable more energy savings on the other base station (e.g., by fully turning off some radios). The ESM may control one or more base stations (not limited to two).

At 1405, the first base station transmits, to the VPP controller, a message comprising at least a traffic profile of the first base station.

At 1406, the second base station transmits, to the VPP controller, a message comprising at least a traffic profile of the second base station.

At 1407, the first base station transmits an energy saving report to the VPP controller. The energy saving report may indicate a measured or predicted amount of energy saving at the first base station, and/or information indicating one or more actions taken by the ESM at the first base station (e.g., based on the energy cost report). The energy saving report may be transmitted together with or separately from the traffic profile.

At 1408, the second base station transmits an energy saving report to the VPP controller. The energy saving report may indicate a measured or predicted amount of energy saving at the second base station, and/or information indicating one or more actions taken by the ESM at the second base station (e.g., based on the energy cost report). The energy saving report may be transmitted together with or separately from the traffic profile.

At 1409, based on the information received from the first base station and the second base station, the VPP controller determines a target value or one or more limits (e.g., upper limit and/or lower limit) for power consumption per base station of the first base station and the second base station. The target value or target limits of the first base station may be the same or different than the target value or target limits of the second base station.

The VPP controller may also determine an amount of possible energy usage considering the provided traffic capacity. The VPP controller may also determine what would be the optimal energy usage considering the electricity price. The VPP controller may decide to perform one or more VPP actions or peak shaving actions based at least on the traffic profiles and the energy saving reports.

At 1410, the VPP controller may negotiate with a TSO and make offers about energy usage depending on the electricity price.

At 1411, the VPP controller transmits an energy consumption control request to the first base station and the second base station. The energy consumption control request may comprise (but is not limited to) at least one of: the target value or the one or more limits (e.g., upper and lower limit) of power consumption, one or more exceptions, and/or hysteresis. In other words, the VPP controller indicates the target value or target limits determined at 1409 to the first base station and the second base station.

At 1412, the VPP controller may detect a change in energy need. For example, the TSO may send updated energy price information and negotiate the price seldomly or even in real time. For example, there may be an urgent need to save power due some power grid issue.

At 1413, in case the VPP controller detects a need to change the energy use, the VPP controller may update the target value or the one or more limits for the power consumption and transmit an updated energy consumption control request to the first base station and/or to the second base station accordingly. In this case, the VPP controller may force multiple base stations to save energy almost instantly to help balance the power grid (e.g., during a power grid issue). The back-up batteries of the base stations may also be used to feed energy to the power grid during short peak situations and/or to force a certain number of base stations to operate on battery power for a short time (e.g., 5 minutes) to allow more time to start reserve power plants.

Herein the terms "first base station" and "second base station" are used to distinguish the base stations, and they do not necessarily mean a specific order or specific identifiers of the base stations.

Figure 15:
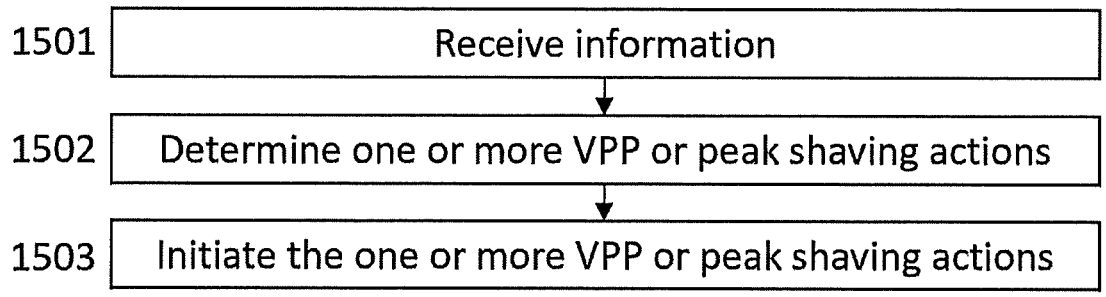
FIG. 15 illustrates a flow chart.

FIG. 15 illustrates a flow chart according to an example embodiment of a method performed by an apparatus 1700. For example, the apparatus 1700 may be, or comprise, or be comprised in, a base station 104, 201, 202, 204, a CU 108, 203, a DU 105, 203, an NMS or SMO 220, or a near-real-time RAN intelligent controller 210. The apparatus may comprise a virtual power plant application 223 or virtual power plant xAPP 212 (virtual power plant controller) or the coordinator of FIG. 4.

Referring to FIG. 15, in block 1501, the apparatus receives, from an application or function 211, 222, 224, information indicating at least one of: one or more actions performed or predicted to be performed by the application or function (e.g., the ESM action information of FIG. 3 or FIG. 4), or one or more key performance indicators (KPIs) indicating an impact or predicted impact of the one or more actions, the one or more actions causing a change in at least one of: communication traffic associated with the one or more base stations, or power consumption of the one or more base stations or one or more subcomponents of the one or more base stations.

The information may be received from at least one of: an energy saving management application or function, a traffic steering application or function, a mobility load balancing application or function, a capacity and coverage optimization application or function, a handover optimization application or function, or a mobility robustness optimization application or function.

As an example, the information received from the energy saving management application or function may indicate at least one of: an estimated amount of energy saved or predicted to be saved due to the one or more actions performed or predicted to be performed by the energy saving management application or function, a time of the one or more actions, a duration of the one or more actions, or a reason for performing the one or more actions.

In other words, the apparatus may receive the one or more KPIs and/or the information indicating the one or more actions. For example, the one or more KPIs may describe the status and impact of ESM actions in the network (e.g., change in traffic, traffic per frequency band, power consumption, etc). These KPIs provide this information explicitly.

In case the received information indicates the one or more actions, the apparatus may determine the impact or predicted impact of the one or more actions. For example, in case ESM sends information on what actions it has taken, the apparatus (VPP controller) may build its own view on the status and changes in the network, and the impact of the ESM actions in the network.

For example, the one or more actions may comprise at least one of: switching one or more radio layers of the one or more base stations on or off, switching one or more cells of the one or more base stations on or off, switching one or more small cells of the one or more base stations on or off, switching a radio technology of the one or more base stations on or off, muting or activating one or more transmitter paths or beams of the one or more base stations, muting or activating one or more receiver paths or beams of the one or more base stations, adjusting transmission power of the one or more base stations, switching one or more computing nodes of the one or more base stations on or off, increasing or decreasing a clock frequency of the one or more computing nodes of the one or more base stations, controlling an idle state behaviour of one or more processors of the one or more base stations, or controlling one or more radio network performance values with respect to energy saving.

In block 1502, the apparatus determines, based at least partly on the received information, one or more virtual power plant actions or one or more peak shaving actions associated with at least one base station of the one or more base stations. In other words, the VPP controller makes a decision impacting its own action.

For example, the one or more virtual power plant actions or the one or more peak shaving actions may be determined based at least partly on the impact or predicted impact of the one or more actions.

In one example, the traffic and/or power consumption changes may be instantaneous events that the VPP controller can utilize even if, for example, the daily power consumption profile remains the same.

The apparatus may select, based at least partly on the received information, the at least one base station from the one or more base stations for the one or more virtual power plant actions or the one or more peak shaving actions.

In block 1503, the apparatus initiates the one or more virtual power plant actions or the one or more peak shaving actions.

For example, the apparatus may obtain an estimate of reserve power capacity or reserve battery capacity or a duration of battery-based operation of the one or more base stations, wherein the one or more virtual power plant actions or the one or more peak shaving actions may be determined or initiated based at least partly on the estimate. The estimate may be estimated at the apparatus for example based on traffic profiles or power consumption profiles of the one or more base station, or the estimate may be received from the application or function.

For example, the one or more virtual power plant actions or the one or more peak shaving actions may comprise at least one of: charging one or more batteries of the at least one base station from a power grid, discharging energy from the one or more batteries to the power grid, operating the at least one base station on battery power, or operating the at least one base station on power provided by the power grid.

Alternatively, or additionally, the apparatus may transmit input information to the application or function.

For example, the input information (e.g., the VPP action information of FIG. 3) may indicate at least one of: the one or more virtual power plant actions or the one or more peak shaving actions initiated or to be initiated by the virtual power plant controller, a utilization time of the one or more peak shaving actions, a duration of the one or more virtual power plant actions, a start time of the one or more virtual power plant actions, a stop time of the one or more virtual power plant actions, or a reason for initiating the one or more virtual power plant actions or the one or more peak shaving actions. In this case, the input information may cause the application or function to perform one or more energy saving management actions during or after the one or more virtual power plant actions or the one or more peak shaving actions.

As another example, the input information may comprise a request (e.g., the energy saving request of FIG. 5) for reducing power consumption of the at least one base station of the one or more base stations. In this case, the input information may cause the application or function to reduce power consumption of the at least one base station based on the request.

As another example, the input information may comprise a report (e.g., the energy consumption report of FIG. 6) indicating an amount of energy consumed by the one or more base stations. In this case, the input information may cause the application or function to perform one or more energy saving management actions based at least partly on the amount of energy consumed by the one or more base stations.

The report may further comprise electricity price information (e.g., the energy consumption and cost report of FIG. 7) indicating a price of energy as a function of time. In this case, the input information may cause the application or function to performed one or more energy saving management actions based at least partly on the price of energy and the amount of energy consumed by the one or more base stations.

As another example, the input information (e.g., the renewable energy capacity or ratio of FIG. 8) may indicate an amount of renewable energy capacity available or predicted to be available for operating the one or more base stations. In this case, the input information may cause the application or function to optimize data traffic and power consumption of the one or more base stations based at least partly on the amount of renewable energy capacity.

As another example, the input information (e.g., the energy consumption control request of FIG. 9) may indicate a target value or one or more limits for power consumption of the at least one base station of the one or more base stations. In this case, the input information may cause the application or function to control the power consumption of the at least one base station based on the target value or the one or more limits.

Alternatively, or additionally, the apparatus may transmit, to an air conditioning control system, a request (e.g., the energy saving request of FIG. 13) for reducing power consumption of air conditioning at the one or more base stations.

Alternatively, or additionally, in case the apparatus comprises the coordinator (see FIG. 4), the apparatus may further determine, based at least partly on the one or more virtual power plant actions or the one or more peak shaving actions, one or more energy saving management actions associated with the at least one base station of the one or more base stations; and initiate the one or more energy saving management actions.

Alternatively, or additionally, in case the apparatus comprises the reporter (see FIG. 11), the apparatus may receive energy consumption information indicating an amount of energy consumed by the one or more base stations; receive a traffic profile of the one or more base stations; estimate, based on the energy consumption information and the traffic profile, an amount of communication traffic served with the amount of energy consumed; and transmit a report indicating the estimated amount of communication traffic served with the amount of energy consumed.

Figure 16:
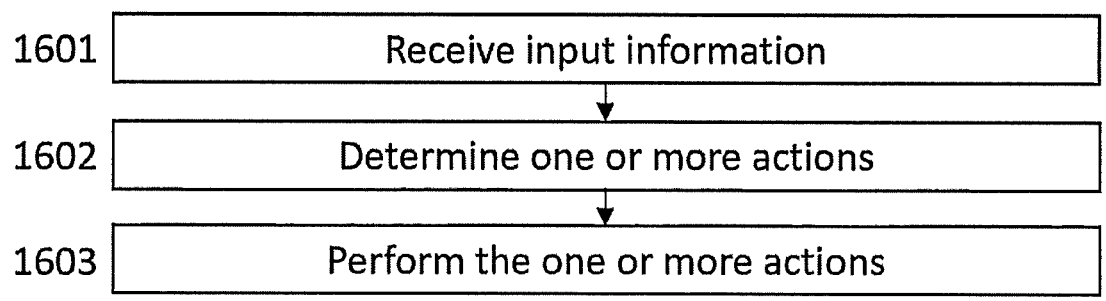
FIG. 16 illustrates a flow chart.

FIG. 16 illustrates a flow chart according to an example embodiment of a method performed by an apparatus 1700. For example, the apparatus 1700 may be, or comprise, or be comprised in, a base station 104, 201, 202, 204, a CU 108, 203, a DU 105, 203, an NMS or SMO 220, or a near-real-time RAN intelligent controller 210. The apparatus may comprise an energy saving management application 222, 224 or energy saving management xAPP 211, or any other application or function that changes load and/or traffic in a cell or changes load distribution across cells.

Referring to FIG. 16, in block 1601, the apparatus receives input information from a virtual power plant controller 212, 223.

In block 1602, the apparatus determines, based on the input information, one or more actions causing a change in at least one of: communication traffic associated with one or more base stations, or power consumption of the one or more base stations or one or more subcomponents of the one or more base stations.

In block 1603, the apparatus performs the one or more actions.

The apparatus may further transmit, to the virtual power plant controller, information indicating at least one of: the one or more actions performed or predicted to be performed, or one or more key performance indicators indicating an impact or predicted impact of the one or more actions.

For example, the input information (e.g., the VPP action information of FIG. 3) may indicate at least one of: one or more virtual power plant actions or one or more peak shaving actions initiated or to be initiated by the virtual power plant controller, a utilization time of the one or more peak shaving actions, a duration of the one or more virtual power plant actions, a start time of the one or more virtual power plant actions, a stop time of the one or more virtual power plant actions, or a reason for initiating the one or more virtual power plant actions or the one or more peak shaving actions. In this case, the one or more actions performed by the apparatus may comprise one or more energy saving management actions performed during or after the one or more virtual power plant actions or the one or more peak shaving actions.

Alternatively, or additionally, the input information may comprise a request (e.g., the energy saving request of FIG. 5) for reducing power consumption of at least one base station of the one or more base stations. In this case, the one or more actions performed by the apparatus may comprise reducing power consumption of the at least one base station based on the request.

Alternatively, or additionally, the input information may comprise a report (e.g., the energy consumption report of FIG. 6) indicating an amount of energy consumed by the one or more base stations. In this case, the one or more actions performed by the apparatus may comprise one or more energy saving management actions that are performed based at least partly on the amount of energy consumed by the one or more base stations.

The report (e.g., the energy consumption and cost report of FIG. 7) may further comprise electricity price information indicating a price of energy as a function of time. In this case, the one or more energy saving management actions may be performed based at least partly on the price of energy and the amount of energy consumed by the one or more base stations.

Alternatively, or additionally, the input information (e.g., the renewable energy capacity or ratio of FIG. 8) may indicate an amount of renewable energy capacity available or predicted to be available for operating the one or more base stations. In this case, the one or more actions performed by the apparatus may comprise optimizing data traffic and power consumption of the one or more base stations based at least partly on the amount of renewable energy capacity.

Alternatively, or additionally, the input information (e.g., the energy consumption control request of FIG. 9) may indicate a target value or one or more limits for power consumption of at least one base station of the one or more base stations. In this case, the one or more actions performed by the apparatus may comprise controlling the power consumption of the at least one base station based on the target value or the one or more limits.

Alternatively, or additionally, the one or more actions may comprise transmitting, to an air conditioning control system, a request for reducing power consumption of air conditioning at the one or more base stations.

It should be noted that some example embodiments can also be used to control generators. For example, in developing markets, diesel generators may be used to operate base stations and nearby villages or settlements. The use of generators for base station operation and villages can be optimized in a similar manner as described above.

The blocks, related functions, and information exchanges (messages) described above by means of FIGS. 3-16 are in no absolute chronological order, and some of them may be performed simultaneously or in an order differing from the described one. Other functions can also be executed between them or within them, and other information may be sent, and/or other rules applied. Some of the blocks or part of the blocks or one or more pieces of information can also be left out or replaced by a corresponding block or part of the block or one or more pieces of information.

As used herein, "at least one of the following: <a list of two or more elements>" and "at least one of <a list of two or more elements>" and similar wording, where the list of two or more elements are joined by "and" or "or", mean at least any one of the elements, or at least any two or more of the elements, or at least all the elements.

Figure 17:
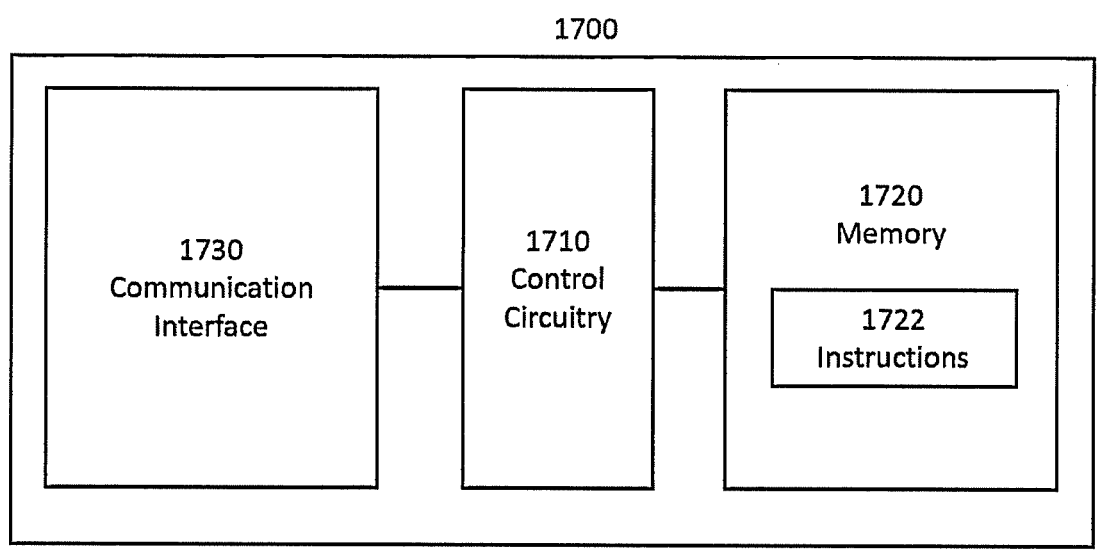
FIG. 17 illustrates an example of an apparatus.

FIG. 17 illustrates an example of an apparatus 1700 comprising means for performing one or more of the example embodiments described above. For example, the means may be provided by a virtual power plant application 223 or virtual power plant xAPP 212 (virtual power plant controller), and/or an energy saving management application 222, 224 or energy saving management xAPP 211 (or another application or function).

The apparatus 1700 may be an apparatus such as, or comprising, or comprised in, a network node of a radio access network. For example, the apparatus 1700 may be, or comprise, or be comprised in, a base station 104, 201, 202, 204, a CU 108, 203, a DU 105, 203, an NMS or SMO 220, or a near-real-time RAN intelligent controller 210.

The apparatus 1700 may comprise, for example, a circuitry or a chipset applicable for realizing one or more of the example embodiments described above. The apparatus 1700 may be an electronic device comprising one or more electronic circuitries. The apparatus 1700 may comprise a communication control circuitry 1710 such as at least one processor, and at least one memory 1720 storing instructions 1722 which, when executed by the at least one processor, cause the apparatus 1700 to carry out one or more of the example embodiments described above. Such instructions 1722 may, for example, include computer program code (software). The at least one processor and the at least one memory storing the instructions may provide the means for providing or causing the performance of any of the methods and/or blocks described above.

The processor is coupled to the memory 1720. The processor is configured to read and write data to and from the memory 1720. The memory 1720 may comprise one or more memory units. The memory units may be volatile or non-volatile. It is to be noted that there may be one or more units of non-volatile memory and one or more units of volatile memory or, alternatively, one or more units of non-volatile memory, or, alternatively, one or more units of volatile memory. Volatile memory may be for example random-access memory (RAM), dynamic random-access memory (DRAM) or synchronous dynamic random-access memory (SDRAM). Non-volatile memory may be for example read-only memory (ROM), programmable read-only memory (PROM), electronically erasable programmable read-only memory (EEPROM), flash memory, optical storage or magnetic storage. In general, memories may be referred to as non-transitory computer readable media. The term "non-transitory," as used herein, is a limitation of the medium itself (i.e., tangible, not a signal) as opposed to a limitation on data storage persistency (e.g., RAM vs. ROM). The memory 1720 stores computer readable instructions that are executed by the processor. For example, non-volatile memory stores the computer readable instructions, and the processor executes the instructions using volatile memory for temporary storage of data and/or instructions.

The computer readable instructions may have been pre-stored to the memory 1720 or, alternatively or additionally, they may be received, by the apparatus, via an electromagnetic carrier signal and/or may be copied from a physical entity such as a computer program product. Execution of the computer readable instructions causes the apparatus 1700 to perform one or more of the functionalities described above.

The memory 1720 may be implemented using any suitable data storage technology, such as semiconductor-based memory devices, flash memory, magnetic memory devices and systems, optical memory devices and systems, fixed memory and/or removable memory. The memory may comprise a configuration database for storing configuration data, such as a current neighbour cell list, and, in some example embodiments, structures of frames used in the detected neighbour cells.

The apparatus 1700 may further comprise or be connected to a communication interface 1730, such as a radio unit, comprising hardware and/or software for realizing communication connectivity with one or more wireless communication devices according to one or more communication protocols. The communication interface 1730 comprises at least one transmitter (Tx) and at least one receiver (Rx) that may be integrated to the apparatus 1700 or that the apparatus 1700 may be connected to. The communication interface 1730 may provide means for performing some of the blocks for one or more example embodiments described above. The communication interface 1730 may comprise one or more components, such as: power amplifier, digital front end (DFE), analog-to-digital converter (ADC), digital-to-analog converter (DAC), frequency converter, (de) modulator, and/or encoder/decoder circuitries, controlled by the corresponding controlling units.

The communication interface 1730 provides the apparatus with radio communication capabilities to communicate in the wireless communication network. The communication interface may, for example, provide a radio interface to one or more wireless communication devices. The apparatus 1700 may further comprise or be connected to another interface towards a core network such as the network coordinator apparatus or AMF, and/or to the access nodes of the cellular communication system.

It is to be noted that the apparatus 1700 may further comprise various components not illustrated in FIG. 17. The various components may be hardware components and/or software components.

As used in this application, the term "circuitry" may refer to one or more or all of the following: a) hardware-only circuit implementations (such as implementations in only analog and/or digital circuitry); and b) combinations of hardware circuits and software, such as (as applicable): i) a combination of analog and/or digital hardware circuit(s) with software/firmware and ii) any portions of hardware processor(s) with software (including digital signal processor(s), software, and memory(ies) that work together to cause an apparatus, such as a mobile phone, to perform various functions); and c) hardware circuit(s) and/or processor(s), such as a microprocessor(s) or a portion of a microprocessor(s), that requires software (for example firmware) for operation, but the software may not be present when it is not needed for operation.

This definition of circuitry applies to all uses of this term in this application, including in any claims. As a further example, as used in this application, the term circuitry also covers an implementation of merely a hardware circuit or processor (or multiple processors) or portion of a hardware circuit or processor and its (or their) accompanying software and/or firmware. The term circuitry also covers, for example and if applicable to the particular claim element, a baseband integrated circuit or processor integrated circuit for a mobile device or a similar integrated circuit in server, a cellular network device, or other computing or network device.

The techniques and methods described herein may be implemented by various means. For example, these techniques may be implemented in hardware (one or more devices), firmware (one or more devices), software (one or more modules), or combinations thereof. For a hardware implementation, the apparatus(es) of example embodiments may be implemented within one or more application-specific integrated circuits (ASICs), digital signal processors (DSPs), digital signal processing devices (DSPDs), programmable logic devices (PLDs), field programmable gate arrays (FPGAs), graphics processing units (GPUs), processors, controllers, micro-controllers, microprocessors, other electronic units designed to perform the functions described herein, or a combination thereof. For firmware or software, the implementation can be carried out through modules of at least one chipset (for example procedures, functions, and so on) that perform the functions described herein. The software codes may be stored in a memory unit and executed by processors. The memory unit may be implemented within the processor or externally to the processor. In the latter case, it can be communicatively coupled to the processor via various means, as is known in the art. Additionally, the components of the systems described herein may be rearranged and/or complemented by additional components in order to facilitate the achievements of the various aspects, etc., described with regard thereto, and they are not limited to the precise configurations set forth in the given figures, as will be appreciated by one skilled in the art.

It will be obvious to a person skilled in the art that, as technology advances, the inventive concept may be implemented in various ways. The embodiments are not limited to the example embodiments described above, but may vary within the scope of the claims. Therefore, all words and expressions should be interpreted broadly, and they are intended to illustrate, not to restrict, the embodiments.

The invention claimed is:

1. An apparatus, comprising:
   at least one processor, and
   at least one memory storing instructions that, when executed by the at least one processor, cause the apparatus at least to:
   receive, from an energy saving management application or function, information indicating at least one of: one or more actions performed with the energy saving management application or function, or one or more key performance indicators indicating an impact or predicted impact of the one or more actions;
   based on the one or more actions, determine at least one of an amount of reserve battery capacity or a duration of battery-based operation of one or more base stations based on a traffic profile or power consumption of the one or more base stations caused by at least one of data rates, latency, jitter, or packet loss requirements of expected data traffic characteristics of a service or application for the one or more base stations;
   based on the determining, cause a change in the traffic profile or power consumption of at least one of:
   data communication traffic associated with the one or more base stations, or power consumption of the one or more base stations;
   determine, based at least partly on the received information one or more peak shaving actions to be performed for at least one base station of the one or more base stations comprising one of charging battery power when the electricity price is low, or offloading a power grid using battery power when the price is high;
   transmit, to the energy saving management application or function, information indicating the one or more peak shaving actions performed for the at least one base station;
   wherein the one or more peak shaving actions are based on at least determined advantages of an electricity price fluctuation determined with the information; and
   initiate the one or more peak shaving actions.

2. The apparatus according to claim 1, wherein the instructions, when executed with the at least one processor, cause the apparatus to:
   determine the impact or predicted impact of the one or more actions, in case the received information indicates the one or more actions,
   wherein the one or more peak shaving actions are determined based at least partly on the impact or predicted impact of the one or more actions.

3. The apparatus according to claim 1, wherein the instructions, when executed with the at least one processor, cause the apparatus to:
   obtain an estimate of reserve power capacity or reserve battery capacity or a duration of battery-based operation of the one or more base stations,
   wherein the one or more peak shaving actions are determined or initiated based at least partly on the estimate.

4. The apparatus according to claim 1, wherein the one or more peak shaving actions comprise at least one of:
   charging one or more batteries of the at least one base station from a power grid, discharging energy from the one or more batteries to the power grid, operating the at least one base station on battery power, or operating the at least one base station on power provided with the power grid.

5. The apparatus according to claim 1, wherein the instructions, when executed with the at least one processor, cause the apparatus to:
   select, based at least partly on the received information, the at least one base station from the one or more base stations for the one or more peak shaving actions.

6. The apparatus according to claim 1, wherein the information received from the energy saving management application or function indicates at least one of: an estimated amount of energy saved or predicted to be saved due to the one or more actions performed or predicted to be performed with the energy saving management application or function, a time of the one or more actions, a duration of the one or more actions, or a reason for performing the one or more actions.

7. The apparatus according to claim 1, wherein the one or more actions comprise at least one of:
   switching one or more radio layers of the one or more base stations on or off,
   switching one or more cells of the one or more base stations on or off,
   switching one or more small cells of the one or more base stations on or off,
   switching a radio technology of the one or more base stations on or off,
   muting or activating one or more transmitter paths or beams of the one or more base stations,
   muting or activating one or more receiver paths or beams of the one or more base stations,
   adjusting transmission power of the one or more base stations,
   switching one or more computing nodes of the one or more base stations on or off, increasing or decreasing a clock frequency of the one or more computing nodes of the one or more base stations,
   controlling an idle state behaviour of one or more processors of the one or more base stations, or
   controlling one or more radio network performance values with respect to energy saving.

8. The apparatus according to claim 1, wherein the instructions, when executed with the at least one processor, cause the apparatus to:
   determine, based at least partly on the one or more peak shaving actions, one or more energy saving management actions associated with the at least one base station of the one or more base stations; and
   initiate the one or more energy saving management actions.

9. The apparatus according to claim 1, wherein the instructions, when executed with the at least one processor, cause the apparatus to:
   receive energy consumption information indicating an amount of energy consumed with the one or more base stations;
   based on the energy consumption information and the traffic profile or power consumption, determine an amount of communication traffic served with the amount of energy consumed; and
   transmit a report indicating the estimated amount of communication traffic served with the amount of energy consumed.

10. The apparatus according to claim 9, wherein the received information further indicates at least one of: a utilization time of the one or more peak shaving actions, a duration of one or more virtual power plant actions, a start time of the one or more virtual power plant actions, a stop time of the one or more virtual power plant actions, or a reason for initiating the one or more virtual power plant actions or the one or more peak shaving actions, wherein the one or more further actions comprise one or more energy saving management actions performed during or after the one or more virtual power plant actions or the one or more peak shaving actions.

11. An apparatus, comprising:
at least one processor, and
at least one memory storing instructions that, when executed by the at least one processor, cause the apparatus at least to:
   transmit, to a virtual power plant controller, information indicating at least one of: one or more actions performed with an energy saving management application or function, or one or more key performance indicators indicating an impact or predicted impact of the one or more actions, based on the one or more actions
   determine at least one of an amount of reserve battery capacity or a duration of battery-based operation of one or more base stations based on a traffic profile or power consumption of the one or more base stations caused by at least one of data rates, latency, jitter, or packet loss requirements of expected data traffic characteristics of a service or application for the one or more base stations;
   based on the determining, cause a change in at least one of: communication traffic associated with the one or more base stations, or power consumption of the one or more base stations;
   receive, from the virtual power plant controller, information indicating one or more peak shaving actions performed for the at least one base station comprising one of charging battery power when the electricity price is low, or offloading a power grid using battery power when the price is high;
   wherein the one or more peak shaving actions are based on at least determined advantages of an electricity price fluctuation determined with the information;
   determine, based on the received information, one or more further actions causing a change in at least one of: the communication traffic associated with the one or more base stations, or the power consumption of the one or more base stations or the one or more subcomponents of the one or more base stations; and
   perform the one or more peak shaving actions.

12. The apparatus according to claim 11, wherein the received information comprises a request for reducing power consumption of at least one base station of the one or more base stations,
   wherein the one or more further actions comprise reducing power consumption of the at least one base station based on the request.

13. The apparatus according to claim 11, wherein the received information comprises a report indicating an amount of energy consumed with the one or more base stations,
   wherein for the peak shaving actions, battery power capacities of the at least one base station are dimensioned dependent on a minimum battery power capacity required to run the at least one base station, and
   wherein the one or more further actions comprise one or more energy saving management actions that are performed based at least partly on the amount of energy consumed with the one or more base stations.

14. The apparatus according to claim 13, wherein the report further comprises electricity price information indicating a price of energy as a function of time,
   wherein the one or more energy saving management actions are performed based at least partly on the price of energy and the amount of energy consumed with the one or more base stations.

15. The apparatus according to claim 11, wherein the received information indicates an amount of renewable energy capacity available or predicted to be available for operating the one or more base stations,
   wherein the one or more further actions comprise optimizing data traffic and power consumption of the one or more base stations based at least partly on the amount of renewable energy capacity.

16. The apparatus according to claim 11, wherein the received information indicates a target value or one or more limits for power consumption of at least one base station of the one or more base stations,
   wherein the one or more further actions comprise controlling the power consumption of the at least one base station based on the target value or the one or more limits.

17. The apparatus according to claim 11, wherein the one or more further actions comprise transmitting, to an air conditioning control system, a request for reducing power consumption of air conditioning at the one or more base stations.

18. A method comprising:
   receiving, from an energy saving management application or function, information indicating at least one of: one or more actions performed with the energy saving management application or function, or one or more key performance indicators indicating an impact or predicted impact of the one or more actions,
   based on the one or more actions determine at least one of an amount of reserve battery capacity or a duration of battery-based operation of one or more base stations based on a traffic profile or power consumption of the one or more base stations caused by at least one of data rates, latency, jitter, or packet loss requirements of expected data traffic characteristics of a service or application for the one or more base stations;
   based on the determining, cause a change in at least one of: communication traffic associated with the one or more base stations, or power consumption of the one or more base stations or one or more subcomponents of the one or more base stations;
   determining, based at least partly on the received information, one or more peak shaving actions to be performed for at least one base station of the one or more base stations comprising one of charging battery power when the electricity price is low, or offloading a power grid using battery power when the price is high;
   transmitting, to the energy saving management application or function, information indicating the one or more peak shaving actions performed for the at least one base station,
   wherein the one or more peak shaving actions are based on at least determined advantages of an electricity price fluctuation determined with the information; and
   initiating the one or more peak shaving actions.

* * * * *